(12) United States Patent
Hodge et al.

(10) Patent No.: US 10,027,797 B1
(45) Date of Patent: Jul. 17, 2018

(54) ALARM CONTROL FOR INMATE CALL MONITORING

(71) Applicant: **GLOBAL TEL*LINK CORP.**, Reston, VA (US)

(72) Inventors: Stephen L. Hodge, Aubrey, TX (US); Catherine Rose Darring-Collins, Semmes, AL (US); Dominick Marino, DeFuniak Springs, FL (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 15/700,850

(22) Filed: Sep. 11, 2017

Related U.S. Application Data

(63) Continuation of application No. 15/591,577, filed on May 10, 2017.

(51) Int. Cl.
  *H04M 3/00* (2006.01)
  *H04M 3/22* (2006.01)
  (Continued)

(52) U.S. Cl.
  CPC ........... *H04M 3/2281* (2013.01); *H04M 3/20* (2013.01); *H04M 3/2218* (2013.01); *H04M 3/38* (2013.01);
  (Continued)

(58) Field of Classification Search
  CPC ......... G10L 15/08; G10L 15/22; G10L 15/26; H04M 1/271; H04M 2201/40;
  (Continued)

(56) References Cited

U.S. PATENT DOCUMENTS 4,054,756 A  10/1977  Comella et al.
4,191,860 A  3/1980  Weber
(Continued)

FOREIGN PATENT DOCUMENTS

EP  1280137 B1  12/2004
EP  2579676 A1  4/2013
(Continued)

OTHER PUBLICATIONS

International Search Report and Written Opinion directed to International Application No. PCT/US2017/026570, dated May 8, 2017; 7 pages.
(Continued)

*Primary Examiner* — Solomon Bezuayehu
(74) *Attorney, Agent, or Firm* — Sterne, Kessler, Goldstein & Fox P.L.L.C.

(57) ABSTRACT

Disclosed herein is an inmate call monitoring station including a processor and/or circuit configured to display data regarding a plurality of inmate communications occurring in a correctional facility on a display, wherein each inmate communication includes a participating inmate from among a plurality of inmates in the correctional facility, receive, from a monitoring server, a first notification indicating detection of a predefined event in a first inmate communication, play audio of the first inmate communication through an output device in response to receiving the first notification, receive, from the monitoring server, a second notification indicating activation of an alarm in response to the detection of the predefined event, wherein the alarm is activated to emit a sound in an area of the correctional facility until the alarm is manually turned off, and transmit, to the monitoring server, a request to suspend the first inmate communication.

20 Claims, 8 Drawing Sheets

(51) Int. Cl.
*H04M 3/20* (2006.01)
*H04M 11/04* (2006.01)
*H04M 3/38* (2006.01)
*H04M 3/42* (2006.01)
*H04M 1/64* (2006.01)

(52) U.S. Cl.
CPC ....... *H04M 3/42221* (2013.01); *H04M 11/04* (2013.01); *H04M 2203/256* (2013.01); *H04M 2203/551* (2013.01); *H04M 2203/558* (2013.01)

(58) Field of Classification Search
CPC ........... H04M 2201/41; H04M 3/2218; H04M 3/2281; H04M 3/38; H04M 3/42221; H04M 3/493; H04M 3/4936
USPC .................................. 379/88.01–88.19, 189
See application file for complete search history.

(56) References Cited

U.S. PATENT DOCUMENTS

| | | |
|---|---|---|
| 4,670,628 A | 6/1987 | Boratgis et al. |
| 4,691,347 A | 9/1987 | Stanley et al. |
| 4,737,982 A | 4/1988 | Boratgis et al. |
| 4,813,070 A | 3/1989 | Humphreys et al. |
| 4,907,221 A | 3/1990 | Pariani et al. |
| 4,918,719 A | 4/1990 | Daudelin |
| 4,935,956 A | 6/1990 | Hellwarth et al. |
| 4,943,973 A | 7/1990 | Werner |
| 4,995,030 A | 2/1991 | Helf |
| 5,185,781 A | 2/1993 | Dowden et al. |
| 5,210,789 A | 5/1993 | Jeffus et al. |
| 5,229,764 A | 7/1993 | Matchett et al. |
| 5,291,548 A | 3/1994 | Tsumura et al. |
| 5,319,702 A | 6/1994 | Kitchin et al. |
| 5,319,735 A | 6/1994 | Preuss et al. |
| 5,345,501 A | 9/1994 | Shelton |
| 5,345,595 A | 9/1994 | Johnson et al. |
| 5,379,345 A | 1/1995 | Greenberg |
| 5,425,091 A | 6/1995 | Josephs |
| 5,438,616 A | 8/1995 | Peoples |
| 5,469,370 A | 11/1995 | Ostrover et al. |
| 5,485,507 A | 1/1996 | Brown et al. |
| 5,502,762 A | 3/1996 | Andrew et al. |
| 5,517,555 A | 5/1996 | Amadon et al. |
| 5,535,194 A | 7/1996 | Brown et al. |
| 5,535,261 A | 7/1996 | Brown et al. |
| 5,539,731 A | 7/1996 | Haneda et al. |
| 5,539,812 A | 7/1996 | Kitchin et al. |
| 5,555,551 A | 9/1996 | Rudokas et al. |
| 5,583,925 A | 12/1996 | Bernstein |
| 5,590,171 A | 12/1996 | Howe |
| 5,592,548 A | 1/1997 | Sih |
| 5,613,004 A | 3/1997 | Cooperman |
| 5,619,561 A | 4/1997 | Reese |
| 5,627,887 A | 5/1997 | Freedman |
| 5,634,086 A | 5/1997 | Rtischev et al. |
| 5,634,126 A | 5/1997 | Norell |
| 5,636,292 A | 6/1997 | Rhoads |
| 5,640,490 A | 6/1997 | Hansen et al. |
| 5,646,940 A | 7/1997 | Hotto |
| 5,649,060 A | 7/1997 | Ellozy et al. |
| 5,655,013 A | 8/1997 | Gainsboro |
| 5,675,704 A | 10/1997 | Juang et al. |
| 5,687,236 A | 11/1997 | Moskowitz |
| 5,710,834 A | 1/1998 | Rhoads |
| 5,719,937 A | 2/1998 | Warren et al. |
| 5,745,558 A | 4/1998 | Richardson, Jr. et al. |
| 5,745,569 A | 4/1998 | Moskowitz |
| 5,745,604 A | 4/1998 | Rhoads |
| 5,748,726 A | 5/1998 | Unno |
| 5,748,763 A | 5/1998 | Rhoads |
| 5,748,783 A | 5/1998 | Rhoads |
| 5,757,889 A | 5/1998 | Ohtake |
| 5,768,355 A | 6/1998 | Salibrici |
| 5,768,426 A | 6/1998 | Rhoads |
| 5,774,452 A | 6/1998 | Greenberg |
| 5,793,415 A | 8/1998 | Gregory, III et al. |
| 5,796,811 A | 8/1998 | McFarlen |
| 5,805,685 A | 9/1998 | McFarlen |
| 5,809,462 A | 9/1998 | Nussbaum |
| 5,822,432 A | 10/1998 | Moskowitz |
| 5,822,436 A | 10/1998 | Rhoads |
| 5,832,068 A | 11/1998 | Smith |
| 5,832,119 A | 11/1998 | Rhoads |
| 5,835,486 A | 11/1998 | Davis et al. |
| 5,841,886 A | 11/1998 | Rhoads |
| 5,841,978 A | 11/1998 | Rhoads |
| 5,850,481 A | 12/1998 | Rhoads |
| 5,861,810 A | 1/1999 | Nguyen |
| 5,862,260 A | 1/1999 | Rhoads |
| 5,867,562 A | 2/1999 | Scherer |
| 5,883,945 A | 3/1999 | Richardson et al. |
| 5,889,868 A | 3/1999 | Seraphim et al. |
| 5,899,972 A | 5/1999 | Miyazawa et al. |
| 5,907,602 A | 5/1999 | Peel et al. |
| 5,915,001 A | 6/1999 | Uppaluru |
| 5,920,834 A | 7/1999 | Sih et al. |
| 5,923,746 A | 7/1999 | Baker et al. |
| 5,926,533 A | 7/1999 | Gainsboro |
| 5,930,369 A | 7/1999 | Cox et al. |
| 5,930,377 A | 7/1999 | Powell et al. |
| 5,937,035 A | 8/1999 | Andruska et al. |
| 5,953,049 A | 9/1999 | Horn et al. |
| 5,960,080 A | 9/1999 | Fahlman et al. |
| 5,963,909 A | 10/1999 | Warren et al. |
| 5,982,891 A | 11/1999 | Ginter et al. |
| 5,991,373 A | 11/1999 | Pattison et al. |
| 5,999,828 A | 12/1999 | Sih et al. |
| 6,011,849 A | 1/2000 | Orrin |
| 6,026,193 A | 2/2000 | Rhoads |
| 6,035,034 A | 3/2000 | Trump |
| 6,038,315 A | 3/2000 | Strait et al. |
| 6,052,454 A | 4/2000 | Kek et al. |
| 6,052,462 A | 4/2000 | Lu |
| 6,058,163 A | 5/2000 | Pattison et al. |
| 6,064,963 A | 5/2000 | Gainsboro |
| 6,072,860 A | 6/2000 | Kek et al. |
| 6,078,567 A | 6/2000 | Traill et al. |
| 6,078,645 A | 6/2000 | Cai et al. |
| 6,078,807 A | 6/2000 | Dunn et al. |
| 6,111,954 A | 8/2000 | Rhoads |
| 6,118,860 A | 9/2000 | Hillson et al. |
| 6,122,392 A | 9/2000 | Rhoads |
| 6,122,403 A | 9/2000 | Rhoads |
| 6,138,119 A | 10/2000 | Hall et al. |
| 6,141,406 A | 10/2000 | Johnson |
| 6,160,903 A | 12/2000 | Hamid et al. |
| 6,173,284 B1 | 1/2001 | Brown |
| 6,175,831 B1 | 1/2001 | Weinreich et al. |
| 6,185,416 B1 | 2/2001 | Rudokas et al. |
| 6,185,683 B1 | 2/2001 | Ginter et al. |
| 6,205,249 B1 | 3/2001 | Moskowitz |
| 6,219,640 B1 | 4/2001 | Basu et al. |
| 6,233,347 B1 | 5/2001 | Chen et al. |
| 6,237,786 B1 | 5/2001 | Ginter et al. |
| 6,243,480 B1 | 6/2001 | Zhao et al. |
| 6,243,676 B1 | 6/2001 | Witteman |
| 6,253,193 B1 | 6/2001 | Ginter et al. |
| 6,263,507 B1 | 7/2001 | Ahmad et al. |
| 6,266,430 B1 | 7/2001 | Rhoads |
| 6,278,772 B1 | 8/2001 | Bowater et al. |
| 6,278,781 B1 | 8/2001 | Rhoads |
| 6,289,108 B1 | 9/2001 | Rhoads |
| 6,301,360 B1 | 10/2001 | Bocionek et al. |
| 6,308,171 B1 | 10/2001 | De La Huerga |
| 6,312,911 B1 | 11/2001 | Bancroft |
| 6,314,192 B1 | 11/2001 | Chen et al. |
| 6,324,573 B1 | 11/2001 | Rhoads |
| 6,324,650 B1 | 11/2001 | Ogilvie |
| 6,330,335 B1 | 12/2001 | Rhoads |
| 6,343,138 B1 | 1/2002 | Rhoads |
| 6,343,738 B1 | 2/2002 | Ogilvie |

(56) References Cited

U.S. PATENT DOCUMENTS

| | | |
|---|---|---|
| 6,345,252 B1 | 2/2002 | Beigi et al. |
| 6,381,321 B1 | 4/2002 | Brown et al. |
| 6,389,293 B1 | 5/2002 | Clore et al. |
| 6,421,645 B1 | 7/2002 | Beigi et al. |
| 6,526,380 B1 | 2/2003 | Thelen et al. |
| 6,542,602 B1 | 4/2003 | Elazar |
| 6,611,583 B1 | 8/2003 | Gainsboro |
| 6,625,261 B2 | 9/2003 | Holtzberg |
| 6,625,587 B1 | 9/2003 | Erten et al. |
| 6,633,846 B1 | 10/2003 | Bennett et al. |
| 6,636,591 B1 | 10/2003 | Swope et al. |
| 6,639,977 B1 | 10/2003 | Swope et al. |
| 6,639,978 B2 | 10/2003 | Draizin et al. |
| 6,647,096 B1 | 11/2003 | Milliorn et al. |
| 6,665,376 B1 | 12/2003 | Brown |
| 6,665,644 B1 | 12/2003 | Kanevsky et al. |
| 6,668,044 B1 | 12/2003 | Schwartz et al. |
| 6,668,045 B1 | 12/2003 | Mow |
| 6,671,292 B1 | 12/2003 | Haartsen |
| 6,688,518 B1 | 2/2004 | Valencia et al. |
| 6,728,345 B2 | 4/2004 | Glowny et al. |
| 6,728,682 B2 | 4/2004 | Fasciano |
| 6,748,356 B1 | 6/2004 | Beigi et al. |
| 6,760,697 B1 | 7/2004 | Neumeyer et al. |
| 6,763,099 B1 | 7/2004 | Blink |
| 6,782,370 B1 | 8/2004 | Stack |
| 6,788,772 B2 | 9/2004 | Barak et al. |
| 6,810,480 B1 | 10/2004 | Parker et al. |
| 6,850,609 B1 | 2/2005 | Schrage |
| 6,880,171 B1 | 4/2005 | Ahmad et al. |
| 6,895,086 B2 | 5/2005 | Martin |
| 6,898,612 B1 | 5/2005 | Parra et al. |
| 6,907,387 B1 | 6/2005 | Reardon |
| 6,920,209 B1 | 7/2005 | Gainsboro |
| 6,947,525 B2 | 9/2005 | Benco |
| 6,970,554 B1 | 11/2005 | Peterson et al. |
| 7,032,007 B2 | 4/2006 | Fellenstein et al. |
| 7,035,386 B1 | 4/2006 | Susen et al. |
| 7,039,171 B2 | 5/2006 | Gickler |
| 7,039,585 B2 | 5/2006 | Wilmot et al. |
| 7,046,779 B2 | 5/2006 | Hesse |
| 7,050,918 B2 | 5/2006 | Pupalaikis et al. |
| 7,062,286 B2 | 6/2006 | Grivas et al. |
| 7,075,919 B1 | 7/2006 | Wendt et al. |
| 7,079,636 B1 | 7/2006 | McNitt et al. |
| 7,079,637 B1 | 7/2006 | McNitt et al. |
| 7,092,494 B1 | 8/2006 | Anders et al. |
| 7,103,549 B2 | 9/2006 | Bennett et al. |
| 7,106,843 B1 | 9/2006 | Gainsboro et al. |
| 7,123,704 B2 | 10/2006 | Martin |
| 7,133,511 B2 | 11/2006 | Buntin et al. |
| 7,133,828 B2 | 11/2006 | Scarano et al. |
| 7,133,845 B1 | 11/2006 | Ginter et al. |
| 7,149,788 B1 | 12/2006 | Gundla et al. |
| 7,191,133 B1 | 3/2007 | Pettay |
| 7,197,560 B2 | 3/2007 | Caslin et al. |
| 7,248,685 B2 | 7/2007 | Martin |
| 7,256,816 B2 | 8/2007 | Profanchik et al. |
| 7,277,468 B2 | 10/2007 | Tian et al. |
| 7,280,816 B2 | 10/2007 | Fratti et al. |
| 7,324,637 B2 | 1/2008 | Brown et al. |
| 7,333,798 B2 | 2/2008 | Hodge |
| 7,366,782 B2 | 4/2008 | Chong et al. |
| 7,406,039 B2 | 7/2008 | Cherian et al. |
| 7,417,983 B2 | 8/2008 | He et al. |
| 7,424,715 B1 | 9/2008 | Dutton |
| 7,466,816 B2 | 12/2008 | Blair |
| 7,494,061 B2 | 2/2009 | Reinhold |
| 7,496,345 B1 | 2/2009 | Rae et al. |
| 7,505,406 B1 | 3/2009 | Spadaro et al. |
| 7,519,169 B1 | 4/2009 | Hingoranee et al. |
| 7,529,357 B1 | 5/2009 | Rae et al. |
| 7,551,732 B2 | 6/2009 | Anders |
| 7,596,498 B2 | 9/2009 | Basu et al. |
| 7,639,791 B2 | 12/2009 | Hodge |
| 7,664,243 B2 | 2/2010 | Martin |
| 7,672,845 B2 | 3/2010 | Beranek et al. |
| 7,698,182 B2 | 4/2010 | Falcone et al. |
| 7,742,581 B2 | 6/2010 | Hodge et al. |
| 7,742,582 B2 | 6/2010 | Harper |
| 7,783,021 B2 | 8/2010 | Hodge |
| 7,804,941 B2 | 9/2010 | Keiser et al. |
| 7,826,604 B2 | 12/2010 | Martin |
| 7,848,510 B2 | 12/2010 | Shaffer et al. |
| 7,853,243 B2 | 12/2010 | Hodge |
| 7,860,222 B1 | 12/2010 | Sidler et al. |
| 7,881,446 B1 | 2/2011 | Apple et al. |
| 7,899,167 B1 | 3/2011 | Rae |
| 7,961,860 B1 | 6/2011 | McFarlen |
| 8,031,052 B2 | 10/2011 | Polozola |
| 8,135,115 B1 | 3/2012 | Hogg, Jr. et al. |
| 8,204,177 B2 | 6/2012 | Harper |
| 8,295,446 B1 | 10/2012 | Apple et al. |
| 8,458,732 B2 | 6/2013 | Hanna et al. |
| 8,488,756 B2 | 7/2013 | Hodge et al. |
| 8,498,937 B1 | 7/2013 | Shipman, Jr. et al. |
| 8,509,390 B2 | 8/2013 | Harper |
| 8,577,003 B2 | 11/2013 | Rae |
| 8,630,726 B2 | 1/2014 | Hodge et al. |
| 8,731,934 B2 | 5/2014 | Olligschlaeger et al. |
| 8,886,663 B2 | 11/2014 | Gainsboro et al. |
| 8,917,848 B2 | 12/2014 | Torgersrud et al. |
| 8,929,525 B1 | 1/2015 | Edwards |
| 9,043,813 B2 | 5/2015 | Hanna et al. |
| 9,077,680 B2 | 7/2015 | Harper |
| 9,094,500 B1 | 7/2015 | Edwards |
| 9,143,609 B2 | 9/2015 | Hodge |
| 9,232,051 B2 | 1/2016 | Torgersrud et al. |
| 9,307,386 B2 | 4/2016 | Hodge et al. |
| 9,396,320 B2 | 7/2016 | Lindemann |
| 9,552,417 B2 | 1/2017 | Olligschlaeger et al. |
| 9,609,121 B1 | 3/2017 | Hodge |
| 9,621,504 B2 | 4/2017 | Torgersrud et al. |
| 9,674,340 B1 | 6/2017 | Hodge |
| 2001/0036821 A1 | 11/2001 | Gainsboro et al. |
| 2001/0043697 A1 | 11/2001 | Cox et al. |
| 2001/0056349 A1 | 12/2001 | St. John |
| 2001/0056461 A1 | 12/2001 | Kampe et al. |
| 2002/0002464 A1 | 1/2002 | Pertrushin |
| 2002/0010587 A1 | 1/2002 | Pertrushin |
| 2002/0032566 A1 | 3/2002 | Tzirkel-Hancock et al. |
| 2002/0046057 A1 | 4/2002 | Ross |
| 2002/0067272 A1 | 6/2002 | Lemelson et al. |
| 2002/0069084 A1 | 6/2002 | Donovan |
| 2002/0076014 A1 | 6/2002 | Holtzberg |
| 2002/0107871 A1 | 8/2002 | Wyzga et al. |
| 2002/0147707 A1 | 10/2002 | Kraay et al. |
| 2002/0174183 A1 | 11/2002 | Saeidi |
| 2003/0002639 A1 | 1/2003 | Huie |
| 2003/0023444 A1 | 1/2003 | St. John |
| 2003/0023874 A1 | 1/2003 | Prokupets et al. |
| 2003/0035514 A1* | 2/2003 | Jang ............... H04M 11/04 379/41 |
| 2003/0040326 A1 | 2/2003 | Levy et al. |
| 2003/0070076 A1 | 4/2003 | Michael |
| 2003/0086546 A1 | 5/2003 | Falcone et al. |
| 2003/0093533 A1 | 5/2003 | Ezerzer et al. |
| 2003/0099337 A1 | 5/2003 | Lord |
| 2003/0126470 A1 | 7/2003 | Crites et al. |
| 2003/0174826 A1 | 9/2003 | Hesse |
| 2003/0190045 A1 | 10/2003 | Huberman et al. |
| 2004/0008828 A1 | 1/2004 | Coles et al. |
| 2004/0029564 A1 | 2/2004 | Hodge |
| 2004/0081296 A1 | 4/2004 | Brown et al. |
| 2004/0161086 A1 | 8/2004 | Buntin et al. |
| 2004/0169683 A1 | 9/2004 | Chiu et al. |
| 2004/0249650 A1 | 12/2004 | Freedman et al. |
| 2004/0252184 A1 | 12/2004 | Hesse et al. |
| 2004/0252447 A1 | 12/2004 | Hesse et al. |
| 2005/0010411 A1 | 1/2005 | Rigazio et al. |
| 2005/0027723 A1 | 2/2005 | Jones et al. |
| 2005/0080625 A1 | 4/2005 | Bennett et al. |
| 2005/0094794 A1 | 5/2005 | Creamer et al. |
| 2005/0102371 A1 | 5/2005 | Aksu |

(56) References Cited

U.S. PATENT DOCUMENTS

| | | | |
|---|---|---|---|
| 2005/0114192 A1 | 5/2005 | Tor et al. | |
| 2005/0125226 A1 | 6/2005 | Magee | |
| 2005/0128283 A1 | 6/2005 | Bulriss et al. | |
| 2005/0141678 A1 | 6/2005 | Anders et al. | |
| 2005/0144004 A1 | 6/2005 | Bennett et al. | |
| 2005/0170818 A1 | 8/2005 | Netanel et al. | |
| 2005/0182628 A1 | 8/2005 | Choi | |
| 2005/0207357 A1 | 9/2005 | Koga | |
| 2006/0064037 A1 | 3/2006 | Shalon et al. | |
| 2006/0087554 A1 | 4/2006 | Boyd et al. | |
| 2006/0087555 A1 | 4/2006 | Boyd et al. | |
| 2006/0093099 A1 | 5/2006 | Cho | |
| 2006/0198504 A1 | 9/2006 | Shemisa et al. | |
| 2006/0200353 A1 | 9/2006 | Bennett | |
| 2006/0285650 A1 | 12/2006 | Hodge | |
| 2006/0285665 A1 | 12/2006 | Wasserblat et al. | |
| 2007/0003026 A1 | 1/2007 | Hodge et al. | |
| 2007/0011008 A1 | 1/2007 | Scarano et al. | |
| 2007/0041545 A1 | 2/2007 | Gainsboro | |
| 2007/0047734 A1 | 3/2007 | Frost | |
| 2007/0071206 A1* | 3/2007 | Gainsboro | H04M 3/2281 |
| | | | 379/168 |
| 2007/0133437 A1 | 6/2007 | Wengrovitz et al. | |
| 2007/0185717 A1 | 8/2007 | Bennett | |
| 2007/0195703 A1* | 8/2007 | Boyajian | G06F 19/3418 |
| | | | 370/241 |
| 2007/0237099 A1 | 10/2007 | He et al. | |
| 2007/0244690 A1 | 10/2007 | Peters | |
| 2008/0000966 A1 | 1/2008 | Keiser | |
| 2008/0021708 A1 | 1/2008 | Bennett et al. | |
| 2008/0046241 A1 | 2/2008 | Osburn et al. | |
| 2008/0096178 A1 | 4/2008 | Rogers et al. | |
| 2008/0106370 A1 | 5/2008 | Perez et al. | |
| 2008/0118045 A1 | 5/2008 | Polozola et al. | |
| 2008/0195387 A1 | 8/2008 | Zigel et al. | |
| 2008/0198978 A1 | 8/2008 | Olligschlaeger | |
| 2008/0201143 A1 | 8/2008 | Olligschlaeger et al. | |
| 2008/0201158 A1 | 8/2008 | Johnson et al. | |
| 2008/0260133 A1 | 10/2008 | Hodge et al. | |
| 2008/0300878 A1 | 12/2008 | Bennett | |
| 2010/0177881 A1 | 7/2010 | Hodge | |
| 2010/0202595 A1 | 8/2010 | Hodge et al. | |
| 2010/0299761 A1 | 11/2010 | Shapiro | |
| 2011/0055256 A1 | 3/2011 | Phillips et al. | |
| 2011/0244440 A1 | 10/2011 | Saxon et al. | |
| 2011/0279228 A1 | 11/2011 | Kumar et al. | |
| 2012/0262271 A1 | 10/2012 | Torgersrud et al. | |
| 2013/0104246 A1 | 4/2013 | Bear et al. | |
| 2013/0179949 A1 | 7/2013 | Shapiro | |
| 2014/0247926 A1* | 9/2014 | Gainsboro | H04M 3/2281 |
| | | | 379/88.01 |
| 2014/0273929 A1 | 9/2014 | Torgersrud | |
| 2014/0287715 A1 | 9/2014 | Hodge et al. | |
| 2014/0313275 A1 | 10/2014 | Gupta et al. | |
| 2015/0206417 A1* | 7/2015 | Bush | G08B 25/016 |
| | | | 340/6.1 |
| 2015/0215254 A1 | 7/2015 | Bennett | |
| 2015/0221151 A1 | 8/2015 | Bacco et al. | |
| 2015/0281433 A1 | 10/2015 | Gainsboro et al. | |
| 2016/0373909 A1* | 12/2016 | Rasmussen | H04W 4/22 |
| 2017/0270627 A1 | 9/2017 | Hodge | |
| 2017/0295212 A1 | 10/2017 | Hodge | |

FOREIGN PATENT DOCUMENTS

| | | |
|---|---|---|
| GB | 2075313 | 11/1981 |
| JP | 59225626 | 12/1984 |
| JP | 60010821 | 1/1985 |
| JP | 61135239 | 6/1986 |
| JP | 3065826 | 3/1991 |
| WO | WO 96/14703 A1 | 3/1995 |
| WO | WO 98/13993 A1 | 4/1998 |
| WO | WO 2001/074042 A2 | 10/2001 |
| WO | WO 2016/028864 A1 | 2/2016 |

OTHER PUBLICATIONS

"Cisco IAD2400 Series Business-Class Integrated Access Device", Cisco Systems Datasheet, 2003; 8 pages.

"Cisco IAD2420 Series Integrated Access Devices Software Configuration Guide—Initial Configuration," Cisco Systems, accessed Sep. 23, 2014, accessible at http://www.cisco.com/en/US/docs/routers/access/2400/2420/software/configuration/guide/init_cf.html; 5 pages.

"Hong Kong: Prison Conditions in 1997," Human Rights Watch, Mar. 1, 1997, C905, available at http://www.refworld.org/docid/3ae6a7d014.html, accessed May 29, 2014; 48 pages.

"PacketCableTM 1.0 Architecture Framework Technical Report", PKT-TR-ARCH-V0 1-001201 (Cable Television Laboratories, Inc. 1999).

"PacketCable™ Audio/Video Codecs Specification," Cable Television Laboratories, Inc., Ser. No. PKT-SP-CODEC-I05-040113 (2004).

"Service-Observing Arrangements Using Key Equipment for Telephone Company Business Offices, Description and Use," Pac. Tel. & Tel. Co., Bell System Practices, Station Operations Manual, Section C71.090, Issue A, 1-1-57-N, 1957; 8 pages.

"SIP and IPLinkTM in the Next Generation Network: An Overview," Intel, 2001; 6 pages.

"The AutoEDMS Document Management and Workflow System: An Overview of Key Features, Functions and Capabilities," ACS Software, May 2003; 32 pages.

"Voice Over Packet in Next Generation Networks: An Architectural Framework," Bellcore, Special Report SR-4717, Issue 1, Jan. 1999; 288 pages.

"Cool Edit Pro, Version 1.2 User Guide," Syntrillium Software Corporation, 1998; 226 pages.

"Criminal Calls: A Review of the Bureau of Prisons' Management of Inmate Telephone Privileges," U.S. Department of Justice, Office of the Inspector General, Aug. 1999; 166 pages.

"Global Call API for Linux and Windows Operating Systems," Intel Dialogic Library Reference, Dec. 2005; 484 pages.

"The NIST Year 2002 Speaker Recognition Evaluation Plan," NIST, Feb. 27, 2002, accessible at http://www.itl.nist.gov/iad/mig/tests/spk/2002/2002-spkrecevalplan-v60.pdf; 9 pages.

Aggarwal, et al., "An Environment for Studying Switching System Software Architecture," IEEE, Global Telecommunications Conference, 1988; 7 pages.

Amendment and Response Under 37 C.F.R. §1.111 dated Sep. 30, 2011, in U.S. Appl. No. 11/706,431; 12 pages.

Auckenthaler, et al., "Speaker-Centric Score Normalization and Time Pattern Analysis for Continuous Speaker Verification," International Conference on Acoustics, Speech, and Signal Processing (ICASSP), vol. 2, Jun. 2000, pp. 1065-1068.

Audacity Team, "About Audacity," World Wide Web, 2014, accessible at http://wiki.audacity.team.org/wiki/About_Audacity; 3 pages.

Beek et al., "An Assessment of the Technology of Automatic Speech Recognition for Military Applications," IEEE Trans. Acoustics, Speech, and Signal Processing, vol. ASSP-25, No. 4, 1977; pp. 310-322.

Beigi, et al., "A Hierarchical Approach to Large-Scale Speaker Recognition," EuroSpeech 1999, Sep. 1999, vol. 5; pp. 2203-2206.

Beigi, et al., "IBM Model-Based and Frame-By-Frame Speaker-Recognition," Speaker Recognition and its Commercial and Forensic Applications, Apr. 1998; pp. 1-4.

Beigi, H., "Challenges of Large-Scale Speaker Recognition," 3rd European Cooperation in the Field of Scientific and Technical Research Conference, Nov. 4, 2005; 33 pages.

Beigi, H., "Decision Theory," Fundamentals of Speaker Recognition, Ch. 9, Springer, US 2011; pp. 313-339.

Bender, et al., "Techniques for Data Hiding," IBM Systems Journal, vol. 35, Nos. 3&4, 1996; 24 pages.

Boersma, et al., "Praat: Doing Phonetics by computer," World Wide Web, 2015, accessible at http://www.fon.hum.uva.nl/praat; 2 pages.

Bolton et al., "Statistical Fraud Detection: A Review," Statistical Science, vol. 17, No. 3 (2002), pp. 235-255.

Boney, L., et al., "Digital Watermarks for Audio Signals" Proceed-

(56) References Cited

OTHER PUBLICATIONS ings of EUSIPCO-96, Eighth European Signal processing Conference, Trieste, Italy, 10-13 (1996).
Boney, L., et al., "Digital Watermarks for Audio Signals" Proceedings of the International Conference on Multimedia Computing Systems, p. 473-480, IEEE Computer Society Press, United States (1996).
Bur Goode, Voice Over Internet Protocol (VoIP), Proceedings of the IEEE, vol. 90, No. 9, Sep. 2002; pp. 1495-1517.
Carey, et al., "User Validation for Mobile Telephones," International. Conference on Acoustics, Speech, and Signal Processing (ICASSP), vol. 2, Jun. 2000, pp. 1093-1096.
Chau, et al., "Building an Infrastructure for Law Enforcement Information Sharing and Collaboration: Design Issues and Challenges," National Conference on Digital Government, 2001; 6 pages.
Chaudhari, et al., "Transformation enhanced multi-grained modeling for text-independent speaker recognition," International Conference on Spoken Language Processing, 2000, pp. 298-301.
Christel, et al., "Interactive Maps for a Digital Video Library," IEEE Special Edition on Multimedia Computing, Jan.-Mar. 2000, IEEE, United States; pp. 60-67.
Clavel, et al., "Events Detection for an Audio-Based Surveillance System," IEEE International Conference on Multimedia and Expo (ICME2005), Jul. 6-8, 2005, pp. 1306-1309.
Coden, et al., "Speech Transcript Analysis for Automatic Search," Proceedings of the 34th Hawaii International Conference on System Sciences, IEEE, 2001; 9 pages.
Coherent Announces Industry's First Remote Management System for Echo Canceller, Business Wire, Mar. 3, 1997; 3 pages.
Complaint for Patent Infringement, filed Aug. 1, 2013, *Securus Technologies, Inc.* v. *Global Tel\*Link Corporation*, Case No. 3:13-cv-03009-K (N.D. Tex.); 9 pages.
Corbato, et al., "Introduction and Overview of the MULTICS System," Proceedings—Fall Joint Computer Conference, 1965; 12 pages.
Cox, et al.; "Secure Spread Spectrum Watermarking for Multimedia," NEC Research Institute, Technical Report 95-10, Dec. 1997; 34 pages.
Defendant's Opening Claim Construction Brief, *Global Tel\*Link Corporation* v. *Securus Technologies, Inc.*, Case No. 3:14-cv-0829-K (N.D. Tex.), filed Nov. 19, 2014; 33 pages.
Defendant's Responsive Claim Construction Brief, *Global Tel\*Link Corporation* v. *Securus Technologies, Inc.*, Case No. 3:14-cv-0829-K (N.D. Tex.), filed Dec. 10, 2014; 21 pages.
Definition of "constantly", The American Heritage Dictionary, 4th Ed. (2002); p. 306.
Definition of "logic", IEEE 100: The Authoritative Dictionary of IEEE Standard Terms, Seventh Edition, Standards Information Network, IEEE Press (2000).
Definition of "telephony", McGraw-Hill Dictionary of Scientific and Technical Terms, 6th Edition (McGraw-Hill, 2003); p. 2112.
Definition of "call data", Newton's Telecom Dictionary, 21st edition, San Francisco: CMP Books, 2005; p. 150.
Definitions of "Local Area Network (LAN)" and "Wide Area Network (WAN)," Microsoft Computer Dictionary (Microsoft Press 2002), pp. 304 and 561.
Definitions of "suspicion" and "suspect", American Heritage Dictionary, 4th Edition, New York: Houghton Mifflin, 2006; pp. 1743-1744.
Digital "Bellcore Notes on the Networks," Bellcore, Special Report SR-2275, Issue 3, Dec. 1997.
Doddington, G., "Speaker Recognition based on Idiolectal Differences between Speakers," 7th European Conference on Speech Communication and Technology, Sep. 3-7, 2001; 4 pages.
Dunn, et al., "Approaches to speaker detection and tracking in conversational speech," Digital Signal Processing, vol. 10, 2000; pp. 92-112.
Dye, Charles, "Oracle Distributed Systems," O'Reilly Media, Inc., Apr. 1, 1999; 29 pages.

Excerpts from IEEE 100: The Authoritative Dictionary of IEEE Standard Terms, Seventh Edition, Standards Information Network, IEEE Press (2000).
Excerpts from the Prosecution History of U.S. Appl. No. 10/135,878, filed Apr. 29, 2002.
Excerpts from the Prosecution History of U.S. Pat. No. 7,899,167, U.S. Appl. No. 10/642,532, filed Aug. 15, 2003.
File History of U.S. Appl. No. 12/861,322, filed Aug. 23, 2010.
File History of U.S. Pat. No. 8,135,115, U.S. Appl. No. 11/603,938, filed Nov. 22, 2006.
File History of U.S. Pat. No. 8,577,003, U.S. Appl. No. 13/009,483, filed Jan. 19, 2011.
File History of U.S. Pat. No. 8,886 663, U.S. Appl. No. 12/284,450, filed Sep. 20, 2008.
File History of U.S. Pat. No. 9,094,500, U.S. Appl. No. 14/322,869, filed Jul. 2, 2014.
File History of U.S. Pat. No. 9,143,609, U.S. Appl. No. 13/949,980, filed Jul. 24, 2013.
Fischer, Alan D., "COPLINK nabs criminals faster," Arizona Daily Star, Jan. 7, 2001; 5 pages.
Fleischman, E., "Advanced Streaming Format (ASF) Specification," Microsoft Corporation, Jan. 9, 1998; 78 pages.
Fox, B., "The First Amendment Rights of Prisoners," 63 J. Crim. L. Criminology & Police Sci. 162, 1972; 24 pages.
Frankel, E., Audioconferencing Options (Teleconferencing Units, Conference Bridges and Service Bureaus), Teleconnect, vol. 4, No. 5, p. 131(3), May 1996; 6 pages.
Furui, et al., "Experimental studies in a new automatic speaker verification system using telephone speech," Acoustics, Speech, and Signal Processing, IEEE International Conference on ICASSP '80, vol. 5, Apr. 1980, pp. 1060-1062.
Furui, S., "50 Years of Progress in Speech and. Speaker Recognition Research," ECTI Transactions on Computer and Information Technology, vol. 1, No. 2, Nov. 2005, pp. 64-74.
Hansen, et al., "Speaker recognition using phoneme-specific gmms," The Speaker and Language Recognition Workshop, May-Jun. 2004; 6 pages.
Hauck, et al., "Coplink: A Case of Intelligent Analysis and Knowledge Management," University of Arizona, 1999; 20 pages.
Hewett, et al., Signaling System No. 7 (SS7/C7): Protocol, Architecture, and Services (Networking Technology), Cisco Press, Jun. 2005; 8 pages.
I2 Investigative Analysis Software; "Chart Reader", URL:http://www.i2.eo.uk/Products/Chart Readers. Jun. 13, 2005.
I2 Investigative Analysis Software; "i2 TextChart—Text Visualized", URL: http://www.i2.co.uk./Products/i2TextChart/. Jun. 13, 2005.
I2 Investigative Analysis Software; "iBase-lnformation Captured", URL: http://www.i2.co.uk/Products/iBase/. Jun. 13, 2005.
I2 Investigative Analysis Software; "iBridge", URL: http://www.i2.eo/uk/Products/iBridge/. Jun. 13, 2005.
I2 Investigative Analysis Software; "Pattern Tracer", URL:http://www.i2.co.uk/Products/Pattern Tracer/. Jun. 13, 2005.
I2 Investigative Analysis Software; "Prisons", URL: http://www.i2.co.uk/Solutions/Prisons/default.aso. Jun. 13, 2005.
I2 Investigative Analysis Software; "Setting International Standards for Investigative Analysis", URL: htto://www.i2.co.uk/Products/index.htm. Jun. 13, 2005.
IMAGIS Technologies, Inc. "Computer Arrest and Booking System", [retrieved from http://www.imagistechnologies.com/Product/CABS.htm] (Nov. 5, 2002) 5 pages.
IMAGIS Technologies, Inc. "Integrated Justice System—Web-based Image and Data Sharing" [retrieved from http://www.imagistechnologies.com/Product/IJISFramework.htm>] (Nov. 5, 2002) 4 pages.
Inmate Telephone Services: Large Business: Voice, Oct. 2, 2001; 3 pages.
Intel® NetStructure High-Density Station Interface (HDSI) Boards Archived Webpage, Intel Corporation, 2003; 2 pages.
International Search Report and Written Opinion directed to International Application No. PCT/US2017/022169, dated May 29, 2017; 57 pages.

(56) References Cited

OTHER PUBLICATIONS

International Search Report for International Application No. PCT/US04/025029, European Patent Office, Netherlands, dated Mar. 14, 2006.

Isobe, et al., "A new cohort normalization using local acoustic information for speaker verification," Proceedings of the IEEE International Conference on Acoustics, Speech, and Signal Processing, vol. 2, Mar. 1999; pp. 841-844.

Joint Claim Construction and Prehearing Statement, Exhibit B: Securus' Intrinsic and Extrinsic Evidence Charts, *Global Tel\*Link Corporation* v. *Securus Technologies, Inc.*, No. 3:14-cv-00829-K (N.D. Tex.), Sep. 26, 2014.

Juang, et al., "Automatic Speech Recognition—A Brief History of the Technology Development," Oct. 8, 2014; 24 pages.

Kinnunen, et al., "Real-Time Speaker Identification and Verification," IEEE Transactions on Audio, Speech, and Language Processing, vol. 14, No. 1, Jan. 2006 pp. 277-288.

Knox, "The Problem of Gangs and Security Threat Groups (STG's) in American Prisons Today: Recent Research Findings From the 2004 Prison Gang Survey," National Gang Crime Research Center, 2005; 67 pages.

Kozamernik, F., "Media Streaming over the Internet—an overview of delivery technologies," EBU Technical Review, Oct. 2002; 15 pages.

Lane, et al., Language Model Switching Based on Topic Detection for Dialog Speech Recognition, Proceedings of the IEEE-ICASSP, vol. 1, 2003, IEEE; pp. 616-619.

Maes, et al., "Conversational speech biometrics," E-Commerce Agents, Marketplace Solutions, Security Issues, and Supply and Demand, Springer-Verlang, London, UK, 2001, pp. 166-179.

Maes, et al., "Open Sesame! Speech, Password or Key to Secure Your Door?," Asian Conference on Computer Vision, Jan. 1998; pp. 1-3.

Matsui, et al., "Concatenated Phoneme Models for Text-Variable Speaker Recognition," International Conference on Acoustics, Speech, and Signal Processing (ICASSP), vol. 2, Apr. 1993; pp. 391-394.

McCollum, "Federal Prisoner Health Care Copayment Act of 2000," House of Representatives Report 106-851, 106th Congress 2d Session, Sep. 14, 2000; 22 pages.

*Microsoft Computer Dictionary*, Fifth Edition, Microsoft Computer Press: Redmond, WA, 2002; 652 pages.

Microsoft White Paper: "Integrated Justice Information Systems", retrieved from Microsoft Justice & Public Safety Solutions (Nov. 5, 2002) [http://jps.directtaps.net_vti bin/owssvr.dll?Using=Default%2ehtm]; 22 pages.

Moattar, et al., "Speech Overlap Detection using Spectral Features and its Application in Speech Indexing," 2nd International Conference on Information & Communication Technologies, 2006; pp. 1270-1274.

National Alliance of Gang Investigators Associations, 2005 National Gang Threat Assessment, 2005, Bureau of Justice Assistance, Office of Justice Programs, U.S. Department of Justice; 73 pages.

National Major Gang Taskforce, "A Study of Gangs and Security Threat Groups in America's Adult Prisons and Jails," 2002; 38 pages.

Navratil, et al., "A Speech Biometrics System With MultiGrained Speaker Modeling," 2000; 5 pages.

Navratil, et al., "Phonetic speaker recognition using maximum-likelihood binary-decision tree models," Proceedings of the IEEE International Conference on Acoustics, Speech, and Signal Processing, Apr. 6-10, 2003; 4 pages.

Newton's Telecom Dictionary, 18th Edition, Feb. 2002; p. 655.

Newton's Telecom Dictionary, 18th Edition, Feb. 2002; p. 168.

Office Action dated Dec. 1, 2011, in Canadian Patent Application No. 2,534,767, DSI-ITI, LLC, filed Aug. 4, 2004.

O'Harrow, R. "U.S. Backs Florida's New Counterterrorism Database; 'Matrix' Offers Law Agencies Faster Access to Americans' Personal Records"; The Washington Post. Washington, D.C., Aug. 6, 2003; p. A 01.

O'Harrow, R.. "Database will make tracking suspected terrorists easier", The Dallas Morning News. Dallas, TX, Aug. 6, 2003; p. 7A.

Olligschlaeger, A. M., "Criminal Intelligence Databases and Applications," in Marilyn B. Peterson, Bob Morehouse, and Richard Wright, Intelligence 2000: Revising the Basic Elements—A Guide for Intelligence Professionals, Mar. 30, 2000 a joint publication of IALEIA and LEIU; 53 pages.

Original Specification as-filed Aug. 26, 2005, in U.S. Appl. No. 11/212,495 to Frost.

Original Specification as-filed Jul. 22, 2005, in U.S. Appl. No. 11/187,423 to Shaffer.

Osifchin, N., "A Telecommunications Buildings/Power Infrastructure in a New Era of Public Networking," IEEE 2000; 7 pages.

Pages from http://www.corp.att.com/history, archived by web.archive.org on Nov. 4, 2013.

Parties' Proposed Claim Constructions in *Global Tel\*Link Corporation* v. *Securus Technologies, Inc.*, No. 3:14-cv-00829-K (N.D. Tex.), filed Sep. 26, 2014; 17 pages.

Pelecanos, J. "Conversational biometrics," in Biometric Consortium Meeting, Baltimore, MD, Sep. 2006, accessible at http://www.biometrics.org/bc2006/presentations/Thu_Sep_21/Session_I/ Peleca nos_Conversational_Biometrics.pdf; 14 pages.

Plaintiffs Opening Claim Construction Brief, *Global Tel\*Link Corporation* v. *Securus Technologies, Inc.*, Case No. 3:14-cv-0829-K (N.D. Tex.), filed Nov. 19, 2014.

Pollack, et al., "On the Identification of Speakers by Voice," The Journal of the Acoustical Society of America, vol. 26, No. 3, May 1954; 4 pages.

Prosecution History of International Patent Application No. PCT/US99/09493 by Brown et al., filed Apr. 29, 1999.

Prosecution History of U.S. Appl. No. 09/072,436, filed May 4, 1998.

Prosecution History of U.S. Appl. No. 11/005,816, filed Dec. 7, 2004.

Prosecution History of U.S. Appl. No. 11/045,589, filed Jan. 28, 2005.

Prosecution History of U.S. Appl. No. 11/182,625, filed Jul. 15, 2005.

Prosecution History of U.S. Appl. No. 11/479,990, filed Jun. 30, 2006.

Prosecution History of U.S. Appl. No. 11/480,258, filed Jun. 30, 2006.

Prosecution History of U.S. Appl. No. 11/609,397, filed Dec. 12, 2006.

Prosecution History of U.S. Appl. No. 12/002,507, filed Dec. 17, 2007.

Response to Office Action, filed Jan. 6, 2009, in Prosecution History of U.S. Appl. No. 10/642,532, filed Aug. 15, 2003.

Rey, R.F., ed., "Engineering and Operations in the Bell System," 2nd Edition, AT&T Bell Laboratories: Murray Hill, NJ, 1983; 884 pages.

Reynolds, D., "Automatic Speaker Recognition Using Gaussian Mixture Speaker Models," The Lincoln Laboratory Journal, vol. 8, No. 2, 1995; pp. 173-192.

Rosenberg, et al., "SIP: Session Initial Protocol," Network Working Group, Standard Track, Jun. 2002; 269 pages.

Rosenberg, et al., "The Use of Cohort Normalized Scores for Speaker Verification," Speech Research Department, AT&T Bell Laboratories, 2nd International Conference on Spoken Language Processing, Oct. 12-16, 1992; 4 pages.

Ross, et al., "Multimodal Biometrics: An Overview," Proc. of 12th European Signal Processing Conference (EUSIPCO), Sep. 2004; pp. 1221-1224.

Science Dynamics, BubbleLINK Software Architecture, 2003; 10 pages.

Science Dynamics, Commander Call Control System, Rev. 1.04, 2002; 16 pages.

(56) References Cited

OTHER PUBLICATIONS

Science Dynamics, Inmate Telephone Control Systems, http://scidyn.com/fraudprev_main.htm (archived by web.archive.org on Jan. 12, 2001).
Science Dynamics, SciDyn BubbleLINK, http://www.scidyn.com/products/bubble.html (archived by web.archive.org on Jun. 18, 2006).
Science Dynamics, SciDyn Call Control Solutions: Commander II, http://www.scidyn.com/products/commander2.html (archived by web.archive.org on Jun. 18, 2006).
Science Dynamics, SciDyn IP Gateways, http://scidyn.com/products/ipgateways.html (archived by web.archive.org on Aug. 15, 2001).
Science Dynamics, Science Dynamics—IP Telephony, http://www.scidyn.com/iptelephony_main.htm (archived by web.archive.org on Oct. 12, 2000).
Shearme, et al., "An Experiment Concerning the Recognition of Voices," Language and Speech, vol. 2, No. 3, Jul./Sep. 1959; 10 pages.
Silberg, L., Digital on Call, HFN the Weekly Newspaper for the Home Furnishing Network, Mar. 17, 1997; 4 pages.
Silberschatz, et al., Operating System Concepts, Third Edition, Addison-Wesley: Reading, MA, Sep. 1991; 700 pages.
Simmons, R., "Why 2007 is Not Like 1984: A Broader Perspective on Technology's Effect on Privacy and Fourth Amendment Jurisprudence," J. Crim. L. & Criminology vol. 97, No. 2, Winter 2007; 39 pages.
Smith, M., "Corrections Turns Over a New LEAF: Correctional Agencies Receive Assistance From the Law Enforcement Analysis Facility," Corrections Today, Oct. 1, 2001; 4 pages.
Specification of U.S. Appl. No. 10/720,848, "Information Management and Movement System and Method," to Viola, et al., filed Nov. 24, 2003.
Specification of U.S. Appl. No. 11/045,589, "Digital Telecommunications Call Management and Monitoring System," to Hodge, filed Jan. 28, 2005; 64 pages.
State of North Carolina Department of Correction RFP #ITS-000938A, issued May 25, 2004; 8 pages.
Statement for the Record of John S. Pistole, Assistant Director, Counterterrorism Division, Federal Bureau of Investigation, Before the Senate Judiciary Committee, Subcommittee on Terrorism, Technology, and Homeland Security, Oct. 14, 2003.
Sundstrom, K., "Voice over IP: An Engineering Analysis," Master's Thesis, Department of Electrical and Computer Engineering, University of Manitoba, Sep. 1999; 140 pages.
Supplementary European Search Report for EP Application No. EP 04 80 9530, Munich, Germany, completed on Mar. 25, 2009.
Tanenbaum, A., *Modern Operating Systems*, Third Edition, Peason Prentice Hall: London, 2009; 552 pages.
Tirkel, A., et al.; "Image Watermarking—A Spread Spectrum Application," Sep. 22-25, 1996; 7 pages.
U.S. Appl. No. 60/607,447, "IP-based telephony system and method," to Apple, et al., filed Sep. 3, 2004.
USPTO Class Definition, Class 379 Telephonic Communications, available at http://www.uspto.gov/web/patents/classification/uspc379/defs379.htm.
Viswanathan, et al., "Multimedia Document Retrieval using Speech and Speaker Recognition," International Journal on Document Analysis and Recognition, Jun. 2000, vol. 2; pp. 1-24.
Walden, R., "Performance Trends for Analog-to-Digital Converters," IEEE Communications Magazine, Feb. 1999.
Weinstein, C., MIT, The Experimental Integrated Switched Network—A System-Level Network Test Facility, IEEE 1983; 8 pages.
Wilkinson, Reginald A., "Visiting in Prison," Prison and Jail Administration's Practices and Theory, 1999; 7 pages.
Winterdyk et al., "Managing Prison Gangs," Journal of Criminal Justice, vol. 38, 2010; pp. 730-736.
Zajic, et al., "A Cohort Methods for Score Normalization in Speaker Verification System, Acceleration of On-Line Cohort Methods," Proceedings of the 12th International Conference "Speech and Computer," Oct. 15-18, 2007; 6 pages.

\* cited by examiner

ALARM CONTROL FOR INMATE CALL MONITORING

CROSS-REFERENCE TO RELATED APPLICATIONS

This application is a divisional of U.S. patent application Ser. No. 15/591,577 filed on May 10, 2017, which is incorporated by reference herein in its entirety.

BACKGROUND

Field

The disclosure relates to systems and methods for providing an audible alarm control for monitoring inmate communications in a controlled environment.

Background

In a controlled environment, such as a correctional facility, inmates have limited opportunities to interact with the outside world. Inmates are allowed to communicate with friends, families, and/or loved ones through telephone calls as it improves recidivism and provides incentives for inmates to follow rules and policies of the correctional facility. However, inmates can utilize telephone calls to engage in illicit activity outside of the prison, threaten parties of interest such as judges and attorneys, and witnesses, and/or communicate with inmates in other prison facilities regarding potential illegal activities.

In order to maintain security, correctional facilities monitor voice calls to identify whether any inmates are engaging in disallowed activity. Nevertheless, most correctional facilities do not have a sufficient amount of personnel available to monitor all of the audio communications of inmates. Many correctional facilities typically monitor a selective amount of live communications and record all remaining communications for later review if an investigation points to a particular inmate, a phone number, or a time of day of an event. Accordingly, there may be a need for new technologies, systems, and methods to enhance inmate call monitoring and allow correctional facilities to intervene quickly and efficiently during calls where illegal activities may be occurring.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
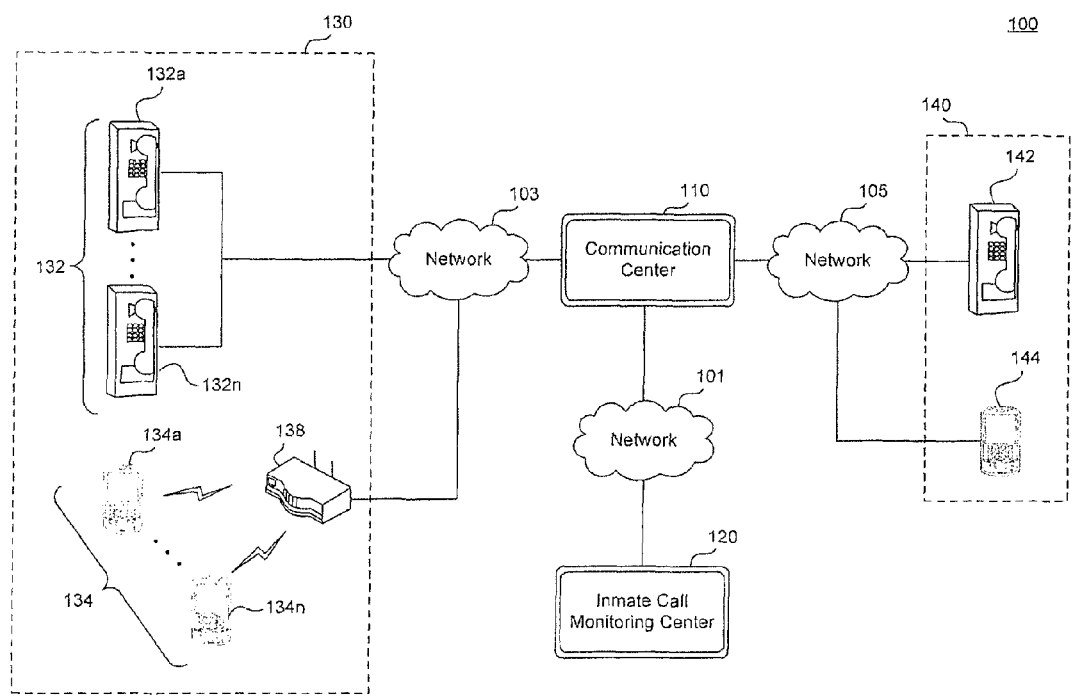
FIG. 1 illustrates a block diagram of an inmate call monitoring system, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, or hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Inmate Call Monitoring System

FIG. 1 illustrates a block diagram of an inmate call monitoring system 100, according to embodiments of the present disclosure. Inmate call monitoring system 100 includes an inmate call monitoring center 120 configured to receive communication data from a communication center 110. In this disclosure, communication data refers to data collected during real-time communications between two parties, such as voice calls, audio communications, and/or video communications between an inmate in a controlled environment using inmate communication system 130 and an outsider using outsider communication system 140. In some embodiments, communication data includes the communication itself, such as audio of a voice calls, as well as data related to the voice call, as will be described in further detail below. The inmate call monitoring center 120 connects to the communication center 110 via a network 101. The network 101 includes at least one of a local area network (LAN), wireless area network (WAN), or the Internet.

In some embodiments, the communication center 110 connects the inmate communication system 130 to the outsider communication system 140. For example, the communication center 110 facilitates call routing for parties within a correctional facility and outside parties, such as via devices within the inmate communication system 130 and outside communication system 140. Inmate communication system 130 includes one or more communication devices available to inmates to perform voice calls within a correctional facility and includes any or all devices such as a plurality of telephones 132 (e.g., telephones 132a-132n) and a plurality of wireless communication devices 134 (e.g., wireless communication devices 134a-134n). In an embodiment, the telephones 132 comprise payphones and/or landline phones that are located locally within the correctional facility, such as in a designated area or room of the controlled environment. For example, the telephones 132 utilize analog "plain old telephony service" (POTS) lines or integrated services digital network (ISDN) lines. In another embodiment, the telephones 132 comprise Voice over Internet (VoIP) phones.

Wireless communication devices 134 are also available to inmates to perform voice calls. These voice calls are routed through a wireless access point 138 (e.g., a router), in which the wireless access point 138 provides connectivity to the wireless communication devices 134. In some embodiments, the telephones 132 and/or the wireless communication devices 134 are located in an area of the correctional facility that is different from the location of the communication center 110 and/or inmate call monitoring center 120. The communication center 110 connects to the telephones 132 and wireless communication devices 134 in the inmate communication system 130 via a network 103. The network 103 comprises at least one of a LAN, WAN, or the Internet. The communication center 110 also connects to the outsider communication system 140. Outsider communication system 140 includes one or more communication devices available to outsiders or individuals external to the correctional facility and/or outside of the inmate communication system 130. For example, outsiders include at least one of family members, friends, loved ones, or inmates located in another correctional facility that is different from the correctional facility of inmate communication system 130. Outsider communication system 140 includes communication devices, such as a telephone 142 and/or a wireless communication device 144.

Although only one telephone 142 and one wireless communication device 144 is shown in FIG. 1, it is understood that there can be any number of components 142 and 144 in the outsider communication system 140. The communication center 110 connects to the outsider communication system 140 via a network 105, in which the network 105 comprises at least one of a WAN, the Internet, and the Public Switched Telephone Network (PSTN). In an embodiment, the WAN facilitates communications with an outsider communication system 140 in other nearby prisons, such as correctional facilities within the same county, state, jurisdiction, or the like. For example, telephones 142 and/or wireless communication devices 144 located at other correctional facilities provide cross-facility visitations between inmates. In another embodiment, the PSTN is used to provide connectivity to the telephones 142 and wireless communication devices 144 over traditional data networks.

Inmate Call Monitoring Center and Alarm Control

Figure 2:
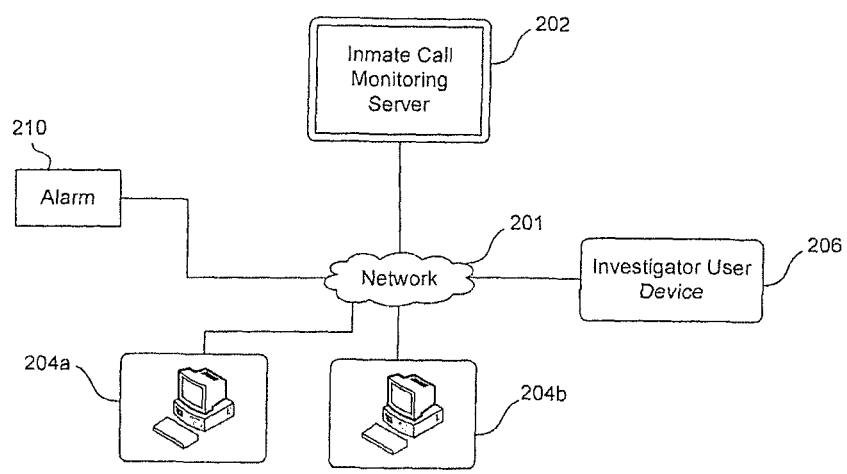
FIG. 2 illustrates a block diagram of an inmate call monitoring center in the inmate call monitoring system, according to embodiments of the present disclosure.

FIG. 2 illustrates a block diagram of an inmate call monitoring center 200, according to embodiments of the present disclosure. Inmate call monitoring center 200 represents an exemplary embodiment of inmate call monitoring center 120 of FIG. 1. The inmate call monitoring center 200 includes an inmate call monitoring server 202 which communicates with inmate call monitoring stations 204a and 204b, an investigator user device 206, and an alarm 210. For example, the inmate call monitoring server 202 interfaces with the inmate call monitoring stations 204a and 204b, the investigator user device 206, and the alarm 210 via a network 201 when receiving communication data from the communication center 110 and transmits the communication data to at least one of the inmate call monitoring stations 204a and 204b or the investigator user device 206. The network 201 includes a LAN, WAN, or the Internet.

Although two inmate call monitoring stations 204a and 204b are shown in FIG. 2, it is understood that there can be any number of components 204a and 204b in the inmate call monitoring center 200. In some embodiments, the inmate call monitoring stations 204a and 204b comprise at least one of a desktop computer, a tablet computer, a laptop computer, a computer terminal, or a wireless device capable of viewing a user interface. In some embodiments, the inmate call monitoring stations 204*a* and 204*b* each include one or more central processing units (CPU), system memory (e.g., RAM), data storage, an input device, such as a keyboard, mouse, camera, and/or microphone, a monitor for displaying a user interface, one or more speakers, a network interface card, and/or a modem that provides network connectivity and communication.

The inmate call monitoring stations 204*a* and 204*b* are located within the correctional facility, such as in one or more designated areas or secure rooms of the controlled environment. In some cases, the inmate call monitoring stations 204*a* and 204*b* are located in a room or area that is adjacent to another room in the correctional facility where the inmate phone calls are occurring (e.g., a room where the plurality of telephones 132 and/or wireless communication devices 134 are located). In some embodiments, one or more employees of the correctional facility (e.g., monitors, corrections officers, guards, or the like) are authorized and assigned to monitor calls between inmates and outsiders in real-time (and/or on delay) using at least one of the inmate call monitoring stations 204*a* and 204*b*. In some cases, the inmate call monitoring server 202 transmits real-time communication data regarding a plurality of calls occurring in the correctional facility to the inmate call monitoring station 204*a* and 204*b*. For example, the real-time communication data includes at least one of the audio from each call occurring at the correctional facility, an inmate name, an inmate identification number, a dialed phone number, a name and identity of a call recipient, a date, a time, and a call duration for each call in the plurality of calls occurring in the correctional facility.

In additional embodiments, the inmate call monitoring server 202 transmits one or more alerts and/or notifications to the inmate call monitoring stations 204*a* and 204*b* regarding detected call anomalies in inmate phone calls at the correctional facility. For example, each inmate is restricted from communicating with (e.g., voice calling) individuals on a blacklist of various parties, such as judges, attorneys, witnesses, other inmates, or the like. The inmate call monitoring server 202 is configured to determine that an inmate is dialing or communicating with a restricted party by detecting one or more call anomalies in inmate phone calls, as will be described in further detail below. Upon detection, the inmate call monitoring server 202 performs alarm activation (e.g., via alarm 210) at the correctional facility and transmits notifications to at least one of the inmate call monitoring stations 204*a* and 204*b* regarding the detected call anomalies. By using the inmate call monitoring stations 204*a* and 204*b*, employees are able to monitor communication data regarding the phone calls of the plurality of inmates in the correctional facility, receive one or more alerts or notifications for detected call anomalies, and access a calling history for each inmate and/or a list of violations during prior calls for each inmate.

The inmate call monitoring server 202 also communicates with the investigator user device 206 and allows communication between the inmate call monitoring stations 204*a* and 204*b* and the investigator user device 206. The investigator user device 206 comprises a desktop computer, a tablet computer, a laptop computer, a computer terminal, or a wireless device capable of viewing a user interface. In some embodiments, the investigator user device 206 includes one or more central processing units (CPU), system memory (e.g., RAM), data storage, an input device, such as a keyboard, mouse, camera, and/or microphone, a monitor for displaying a user interface, a network interface card, and/or a modem that provides network connectivity and communication.

In some embodiments, the investigator user device 206 comprises a user device associated with an individual (e.g., investigator, detective, prosecutor, administrator, or the like) who is authorized to investigate inmates who have violated rules of the correctional facilities during phone calls. For example, inmates violate rules by using phone calls to engage in illicit activities outside of the prison, such as by calling one or more individuals whom they are not allowed to contact (e.g., judges, attorneys, witnesses, and the like). In some embodiments, the inmate call monitoring server 202 identifies that an inmate is engaging in an illicit activity during a phone call by detecting call anomalies, and the monitoring server 202 dials in or bridges the investigator user device 206 to the phone call of the inmate. For example, the phone call utilizes voice over IP (VoIP) through the network 201, and the monitoring server 202 connects the investigator user device 206 to the phone call through VoIP. In some cases, the investigator user device 206 is bridged to the phone call without the knowledge of the calling parties. For example, the inmate and the outsider (e.g., the call recipient of the inmate's phone call) may continue speaking on the phone call, and an investigator is bridged into the call without either of the calling parties knowing or hearing an audible difference or change in the phone call. By bridging investigators into inmate phone calls, the investigator user device 206 allows individuals to examine and investigate any suspicious or fraudulent activities occurring in inmate phone calls.

The inmate call monitoring server 202 also communicates with the alarm 210 in the inmate call monitoring center 200. In some embodiments, the alarm 210 represents an alarm system installed in the correctional facility, such as in the same room or area of where the inmate call monitoring stations 204*a* and 204*b* are located. For example, the alarm 210 is located in a room on-site and is accessible to authorized employees of the correctional facility, such as monitors, corrections officers, guards, or the like. In some embodiments, the alarm 210 is activated by the inmate call monitoring server 202 in response to detecting an anomaly in an inmate phone call during monitoring. For example, the alarm 210 is activated to emit a sound in the same area or room of where the inmate call monitoring stations 204*a* and 204*b* are located. In additional or alternative embodiments, the alarm 210 is activated to turn on a light (e.g., a flashing light or strobe light) in the in the same area or room of where the inmate call monitoring stations 204*a* and 204*b* are located. After activation, the alarm 210 is disarmed or deactivated manually by a user, such as by entering a code on a keypad of the alarm 210, by pressing a button on the alarm 210, or by turning off a switch on the alarm 210. By activating the alarm 210 and allowing manual deactivation of the alarm 210, the inmate call monitoring center 200 allows authorized individuals of the correctional facility who are monitoring several inmate calls to be audibly or visually notified of call anomalies occurring in particular inmate phone calls.

Inmate Call Monitoring Server

Figure 3:
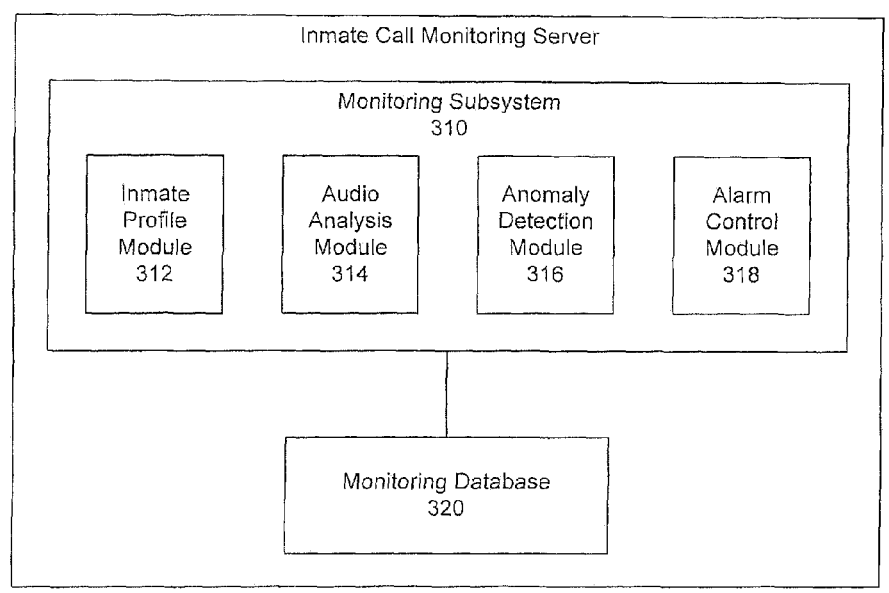
FIG. 3 illustrates a block diagram of an inmate call monitoring server, according to embodiments of the present disclosure.

FIG. 3 illustrates a block diagram of the inmate call monitoring server 300, according to embodiments of the present disclosure. Inmate call monitoring server 300 represents an exemplary embodiment of inmate call monitoring server 202 in FIG. 2. Inmate call monitoring server 300 includes at least one of a monitoring subsystem 310 and a monitoring database 320, as shown in FIG. 3. In some embodiments, monitoring subsystem 310 includes one or more processors, computers, or servers identified as subsystems and is constructed as individual physical hardware devices, or as virtual devices, such as a virtual server.

In some embodiments, monitoring subsystem 310 functions as the primary logic processing center in inmate call monitoring server 300. Monitoring subsystem 310 manages and facilitates overall communication between modules and database(s) of inmate call monitoring server 300 and devices and/or systems external to inmate call monitoring server 300, such as inmate call monitoring station 204a and 204b, investigator user device 206, alarm 210, and/or communication center 110. Monitoring subsystem 310 includes inmate profile module 312, audio analysis module 314, anomaly detection module 316, and alarm control module 318.

Inmate profile module 312 obtains and stores profile information and inmate calling information for each inmate in the correctional facility. In some embodiments, inmate profile module 312 obtains profile information related to the inmates from one or more of (a) a jail management system (JMS) or an offender management system (OMS) operated by the jurisdiction of the correctional facility, (b) a public database containing information on the inmates, or (c) a questionnaire provided by a web page, a personal approved number (PAN) list, or booking information. In some embodiments, profile information obtained by inmate profile module 312 includes personal information for each inmate, such as names, previous residences or correctional facilities, authorized contacts (e.g., including a name, identity, phone number, and the like for each authorized contact), family members, and languages. In additional embodiments, the inmate profile module 312 also obtains booking information or case information for each inmate, such as names, addresses, and contact information (e.g., phone numbers) of one or more attorneys, judges, witnesses, or other individuals pertinent to an inmate's case.

By collecting this information, the inmate profile module 312 is configured to determine, for each inmate, a whitelist of contacts that the inmate is allowed to contact and/or a blacklist of contacts that the inmate is restricted from contacting. For example, the whitelist and/or blacklist include names, identities, and phone numbers for each listed contact. In some cases, the monitoring subsystem 310 communicates with inmate profile subsystem 312 to access the whitelist and/or blacklist data and identify whether or not an inmate is violating rules of the correctional facility by calling a disallowed party (e.g., a blacklisted contact). Additionally, inmate profile module 312 collects and manages inmate calling information, such as a calling history for each inmate, including at least one of previously dialed phone numbers, identities of individuals called, dates, times and durations of each call of each inmate, call anomalies detected in prior calls for each inmate, and the like. In some cases, the calling history for each inmate includes information for calls received over a predetermined time period, such as 30 days, one month, 6 months, one year, or any other time period during each inmate's sentence at the correctional facility. In some embodiments, the monitoring subsystem 310 communicates with inmate profile module 312 to access the inmate calling history during inmate call monitoring and/or review of inmate call records.

Audio analysis module 314 obtains and manages communication data for inmate phone calls in the correctional facility. Audio analysis module 314 facilitates real-time monitoring, processing, and/or recording of audio collected during voice calls between an inmate in a controlled environment using inmate communication system 130 and an outsider using outsider communication system 140. In some embodiments, audio analysis module 314 receives communication data, such as audio for each voice call, from the communication center 110. In addition to receiving the audio for each voice call, audio analysis module 314 also receives data associated with the audio for each inmate call. For example, data associated with the audio for each inmate call includes at least one of a date and time of the audio, duration of the inmate call, identities of parties on the inmate call, which telephone or device was used for the inmate call (e.g., one of telephones 132 or wireless communication devices 134), and the like.

Audio analysis module 314 is further configured to process and transmit the audio and associated data for each voice call to inmate call monitoring stations 204a and 204b. For example, when an inmate uses telephone 132 or wireless communication device 134 in inmate communication system to call an outsider using telephone 144 or wireless communication device 144 in outsider communication system 140, audio analysis module 314 receives the audio and associated data for the call from the communication center 110, records the audio, stores the audio and associated data (e.g., in monitoring database 320), and transmits the audio and associated data to at least one of the inmate call monitoring stations 204a and 204b. In some embodiments, audio analysis module 314 may transmit the audio and associated data to the inmate call monitoring stations 204a and 204b only after an anomaly has been detected in a particular inmate call. For example, by transmitting data after an anomaly has been detected, the audio analysis module 314 allows the inmate call monitoring stations 204a and 204b to receive data for audio calls where suspicious activity may be occurring, such that individuals at the monitoring stations are able to monitor the calls further and take action quickly.

In some embodiments, audio analysis module 314 processes audio by performing decryption and encryption of audio data received from the communication center 110. For example, audio analysis module 314 decrypts audio data received from the communication center 110, and encrypts the audio data prior to transmitting the audio data to inmate call monitoring stations 204a and 204b, such as for security purposes. Further decryption of the audio data may occur at the inmate call monitoring stations 204a and 204b as well. In additional embodiments, audio analysis module 314 also performs voice recognition on audio received from the communication center 110 to verify the identity of an inmate and/or the identity of an outsider on the phone call. Audio analysis module 314 utilizes one or more speech recognition algorithms to determine whether audio of an inmate's or outsider's voice in a call matches reference audio of the inmate's or outsider's voice. For example, reference audio of the inmate's or outsider's voice is extracted and compiled from previous inmate calls and stored in the audio analysis module 314 and/or the monitoring database 320. If the audio of the inmate or outsider's voice does not match, the audio analysis module 314 may communicate with the anomaly detection module 316 to perform further analysis and/or transmit the audio to the inmate call monitoring stations 204a and 204b for further monitoring and analysis.

Anomaly detection module 316 analyzes audio and detects call anomalies in phone calls of inmates at the correctional facility. In some embodiments, anomaly detection module 316 is configured to detect any call anomaly or calling event which may indicate that an inmate is engaging in an illicit activity during a phone call (e.g., calling events that are prohibited by the correctional facility). For example, inmates may engage in illicit activities during phone calls, such as by using phone calls to call one or more individuals whom they are not allowed to contact (e.g., judges, attorneys, witnesses, and the like). Anomaly detection module 316 is configured to identify violations by detecting call anomalies, such as three-way calling, call forwarding, extra dialed digits in a call, a dialed phone number that is not in a list of phone numbers approved for the first inmate, or the like.

In some embodiments, an inmate calls an outsider (e.g., the called party) who is listed on a whitelist of contacts that the inmate is allowed to contact, and the outsider performs a three-way calling event to call a third party whom the inmate is prohibited from contacting. The anomaly detection module 316 detects the three-way calling event in the inmate phone call by detecting a "clicking" sound that is made on the phone call when the called party switches to a different line to initiate a call with a third party. In other examples, the anomaly detection module 316 detects the three-way calling event by detecting an extended period of silence during an inmate phone call (e.g., resulting from the called party leaving the call with the inmate for some period of time to initiate a call session with a third party) and/or by detecting a loud sustained noise or unusual noise during an inmate phone call (e.g., resulting from an inmate attempting to mask the silence or "clicking" sound associated with three way calling).

In other embodiments, an inmate dials a phone number that is listed on a whitelist of phone numbers for contacts with whom the inmate is allowed to communicate, and the phone call is redirected or forwarded to another destination, such as a phone number of a third whom the inmate is prohibited from contacting. The anomaly detection module 316 detects this call forwarding event in the inmate phone call by monitoring the phone call for a "ringback" tone that is detected after the phone call has been answered, indicating that the call has been forwarded to another phone number. In additional embodiments, anomaly detection module 316 detects one or more call anomalies during a phone call by detecting that extra digits have been dialed during the phone call. For example, anomaly detection module 316 detects dialed digits other than a country code, a three-digit area code, a three-digit central office code, and four digits for a line number. In some cases, anomaly detection module 316 also communicates with the inmate profile module 312 to identify the whitelist of contacts that the inmate is allowed to contact and/or the blacklist of contacts that the inmate is restricted from contacting. By using lists of allowed and/or restricted calling parties, the anomaly detection module 316 is able to detect a call anomaly of an inmate calling a restricted contact.

In some embodiments, anomaly detection module 316 performs anomaly detection of inmate phone calls in or near real-time (e.g., as the phone calls are occurring), whereas in other embodiments, anomaly detection module 316 receives audio data for an inmate phone call from communication center 110 and/or from audio analysis module 314 and performs a delayed anomaly detection on the received audio data. Upon detection of a call anomaly, anomaly detection module 316 communicates with alarm control module 318 to perform alarm activation and also communicates with monitoring subsystem 310 to provide alerts and/or notifications to at least one of the inmate call monitoring stations 204a and 204b. For example, anomaly detection module 316 detects a call anomaly and communicates the detected call anomaly to the alarm control module 318 and the monitoring subsystem 310, and the monitoring subsystem 310 generates one or more notifications that are transmitted to at least one of the inmate call monitoring stations 204a and 204b, in which the one or more notifications indicate that a call anomaly has been detected in a particular inmate's phone call.

Alarm control module 318 manages alarm activation and communication with an alarm in response to detection of a call anomaly in an inmate phone call. In some embodiments, alarm control module 318 receives a communication from anomaly detection module 316 indicating that a call anomaly has been detected in a particular inmate's phone call. In response to receiving the communication, the alarm control module 318 transmits an activation signal to an alarm (e.g., alarm 210) to turn on. Upon activation, the alarm subsequently emits a sound or turns on a light in a designated area of the correctional facility to alert one or more monitors, corrections officers, guards, or other employees of the correctional facility that an inmate is potentially engaging in a prohibited activity during his or her phone call. By transmitting a signal to turn on an alarm, the alarm control module 318 allows employees of the correctional facility to be alerted audibly or visually, such that the employees may pay closer attention to monitoring inmate phone calls of interest and take further actions to prevent or suspend suspicious inmate phone calls.

In some embodiments, alarm control module 318 also generates one or more notifications indicating that an alarm has been activated and transmits the notifications to at least one of the inmate call monitoring stations 204a and 204b. For example, the one or more notifications indicate that the alarm has been activated for a predetermined period of time and that the alarm can be turned off manually after the predetermined period of time ends. In some cases, the alarm is unable to be turned off manually by an administrator of the correctional facility until the predetermined period of time has elapsed (e.g., after 1 minute, 2 minutes, 5 minutes, 10 minutes, or the like). In additional embodiments, the alarm control module 318 receives one or more communications or signals from the alarm indicating that the alarm has been turned off. The alarm control module 318 also tracks and stores data (e.g., internally or in monitoring database 320) on what times and dates the alarm has been turned on, how often an alarm has been turned on (e.g., frequency values), how long it takes for the alarm to be turned off manually, and the like.

Monitoring database 320 comprises any number of databases and/or servers, and stores and organizes data in one or more relational databases. Monitoring database 320 runs a database management system, such as MYSQL™, to provide an example. In some embodiments, monitoring database 320 includes organized data, such as inmate profile data, whitelist and/or blacklist data for inmate, calling history data, audio data, detected anomaly data, alarm activation data, and settings that are indexed and linked to allow access to data for monitoring subsystem 310, inmate profile module 312, audio analysis module 314, anomaly detection module 316, and/or alarm control module 318.

Alarm System

Figure 4:
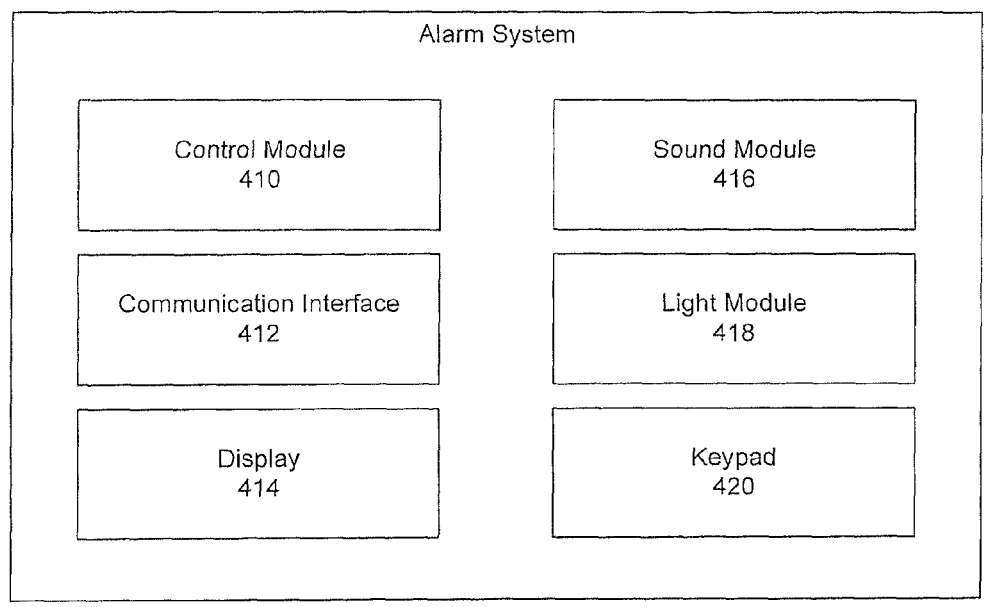
FIG. 4 illustrates a block diagram of an alarm system in the inmate call monitoring center, according to embodiments of the present disclosure.

FIG. 4 illustrates a block diagram of an alarm system 400 in the inmate call monitoring center 200, according to embodiments of the present disclosure. Alarm system 400 represents an exemplary embodiment of alarm 210 in FIG. 2. In some embodiments, alarm system 400 includes one or more devices, modules, and components that represent an alarm system in the correctional facility. Alarm system 400 includes control module 410, communication interface 412, display 414, sound module 416, light module 418, and keypad 420.

Control module 410 manages alarm activation and alarm configuration settings for the alarm system 400. In some embodiments, alarm configuration settings include volume control, brightness or light intensity adjustment, predetermined length of time for the alarm, and the like. Employees in the correctional facility can modify one or more alarm configuration settings by utilizing the keypad 420 or another input device of the alarm to provide user input to the control module 410. In additional embodiments, control module 410 communicates with the other components or modules in the alarm system 400, such as communication interface 412, display 414, sound module 416, light module 418, and/or keypad 420.

Communication interface 412 includes one or more transceivers, transmitters, and/or receivers that communicate via a wireless interface or a wired interface, such as through a USB cable. In some embodiments, communication interface 412 allows communication amongst components in the alarm system 400, such as by allowing control module 410 to communicate with display 414, sound module 416, light module 418, and/or keypad 420. Communication interface 412 also allows the alarm system 400 to communicate with the inmate call monitoring server 300 and the inmate call monitoring stations 204a and 204b. In additional embodiments, communication interface 412 also connects the alarm system 400 with other external input devices, such as keypad 420, mouse, camera, or touch interface.

Display 414 includes a display device that allows the alarm system 400 to output alarm status and other information to employees of the correctional facility. In some embodiments, display 414 includes a LCD screen, a monitor, touchscreen, or the like. Keypad 420 allows employees of the correctional facility to enter one or more codes to deactivate an alarm that has been activated by the inmate call monitoring server 300. In some embodiments, the alarm system 400 includes one or more additional or alternative user input devices in addition to or alternative to the keypad 420, such as a touch interface, microphone, camera, or the like. For example, the alaı u system 400 can use a microphone or camera to authenticate the identity of an employee who is deactivating the alarm system 400 (e.g., by speech recognition of the employee's voice or image analysis of the employee's image).

Alarm system 400 also includes at least one the sound module 416 or light module 418. Sound module 416 includes one or more components that allow control and output of an audible alarm from the alarm system 400. For example, sound module 416 is configured to produce a plurality of alarm sounds that can be selected to be emitted at varying decibel levels. Sound module 416 also controls the predetermined period of time that the alarm is activated for, as well as a pulsing option for the alarm sounds. In some embodiments, alarm sounds implemented by the sound module 416 include at least one of a siren, horn, bell, beeping sound, or the like.

Light module 418 includes one or more components that allow control and output of a visual alarm from the alarm system 400. For example, light module 418 is configured to generate one or more lights that can be selected to be emitted at varying brightness or luminescence levels. In some embodiments, light module 418 controls the wavelengths at which the one or more lights are emitted. Light module 418 also controls the predetermined period of time that the alarm is activated for, as well as managing pulsing options for the lights. Lights implemented by the light module 418 include at least one of a light-emitting diode (LED) lights, incandescent lights, flashing lights, strobe lights, colored lights (e.g., lights emitted at various wavelengths), and the like.

In some embodiments, control module 410 controls activation of the sound module 416 and/or light module 418. For example, control module 418 receives activation signals from the alarm control module 318 of the inmate call monitoring server 300. In response to receiving an activation signal, the control module 418 communicates with the sound module 416 and/or light module 418 to activate one or more audible and/or visual alarms. The alarm is activated to emit a sound and/or light in the designated area of the correctional facility for a predetermined period of time. In some embodiments, an employee of the correctional facility is able to turn off the activated alarm manually before the predetermined period of time ends by entering a code (e.g., alphanumeric characters) through the keypad 420 to override the alarm system 400.

In some embodiments, alarm system 400 only includes one of the sound module 416 or light module 418. For example, alarm system 400 may only have a sound module 416 to provide an audible alarm in the correctional facility and might not include the light module 418 as well. In another example, alarm system 400 may only have a light module 418 to provide a visual alarm in the correctional facility and might not include the sound module 416 as well. In other embodiments, alarm system 400 includes both the sound module 416 and light module 418 to provide both an audible alarm and a visual alarm, in which users can configure the alarm settings to alternate the alarms, use both alarm simultaneously, or choose various scenarios of when to use the audible alarm versus the visual alarm.

Inmate Call Monitoring Station

Figure 5:
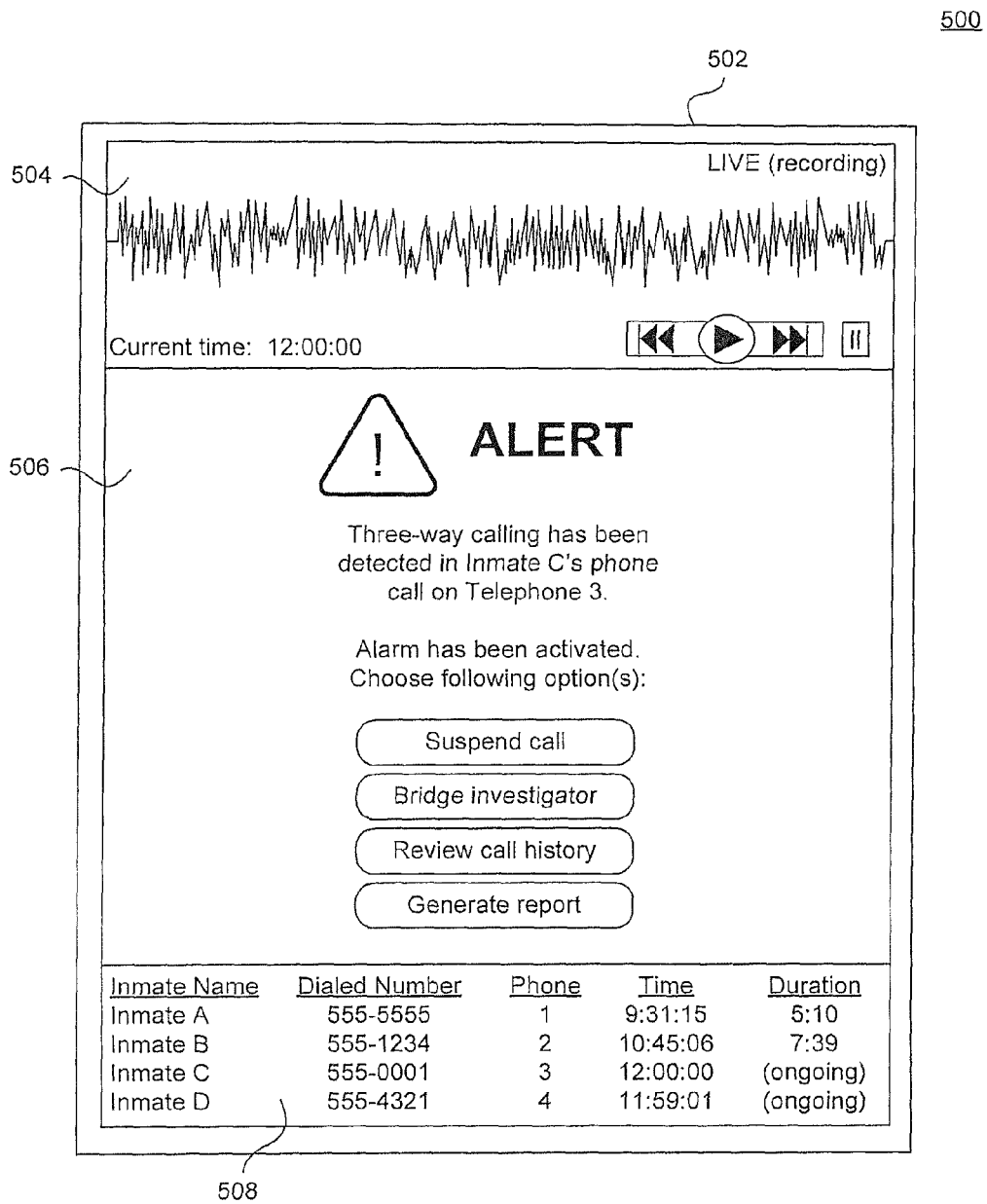
FIG. 5 illustrates a user interface of an inmate call monitoring station, according to embodiments of the present disclosure.

FIG. 5 illustrates a user interface 500 of an inmate call monitoring station, according to embodiments of the present disclosure. The user interface 500 represents an exemplary embodiment of a user interface for one of the inmate call monitoring stations 204a and 204b of FIG. 2. The user interface 500 includes an interface window 502 with different panels to facilitate review of a phone call between an inmate and an outsider. The interface window 502 includes an audio panel 502, an alert panel 506, and a data panel 508. The audio panel 502 displays an audio signal of a phone call occurring between an inmate and an outsider. In some embodiments, the audio signal is live or obtained in real-time (e.g., from communication center 110) and is being recorded. The audio panel 502 further displays the time and includes one or more buttons to play, pause, rewind, or fast forward the audio of the phone call.

The alert panel 506 displays information regarding call anomaly detection and alarm activation. For example, the alert panel 506 provides an alert or notification regarding detecting a call anomaly, such as three-way calling, in a particular inmate's phone call. The alert panel 506 also notifies a user of the inmate call monitoring station that an alarm has been activated in a designated area of the correctional facility, such in the same area of the inmate call monitoring stations 204a and 204b. In some embodiments, the alert panel 506 also provides one or more options to the user monitoring the inmate phone call, in which the user may request to suspend the inmate phone call after an anomaly has been detected, bridge an investigator to the inmate phone call, review call history of the inmate, or generate a report on the inmate, including information regarding at least one of the inmate's previous violations, the inmate's calling history, whitelisted numbers for the inmate, blacklisted numbers of the inmate, or the like. Upon selection of one of the options in the alert panel 506, the inmate call monitoring server 202 receives an indication to perform the action requested by the user at one of the inmate call monitoring stations 204a and 204b.

The data panel 508 provides the user with access to data regarding a plurality of inmate phone calls that may be occurring simultaneously or within a predetermined period of time at the correctional facility. For example, the data panel 508 includes data such as an inmate's name, a dialed phone number of an outsider, an identification number for the telephone used by the inmate at the correctional facility, a time that the outsider's phone number was dialed, and duration of the call. In some embodiments, the inmate phone call is ongoing, and the audio from the ongoing phone call is displayed in audio panel 504.

System Operation

Operations of providing inmate call monitoring and alarm activation services to inmates in a correctional facility through inmate call monitoring system 100 will be described with respect to FIGS. 6 and 7. Although the physical devices and components that form the system have largely already been described, additional details regarding their more nuanced operation will be described below with respect to FIGS. 1-4. While FIGS. 6 and 7 contain methods of operation of monitoring inmate calls and activating an alarm through the inmate call monitoring system 100, the operations are not limited to the order described below, and various operations can be performed in a different order. Further, two or more operations of each method can be performed simultaneously with each other.

Figure 6:
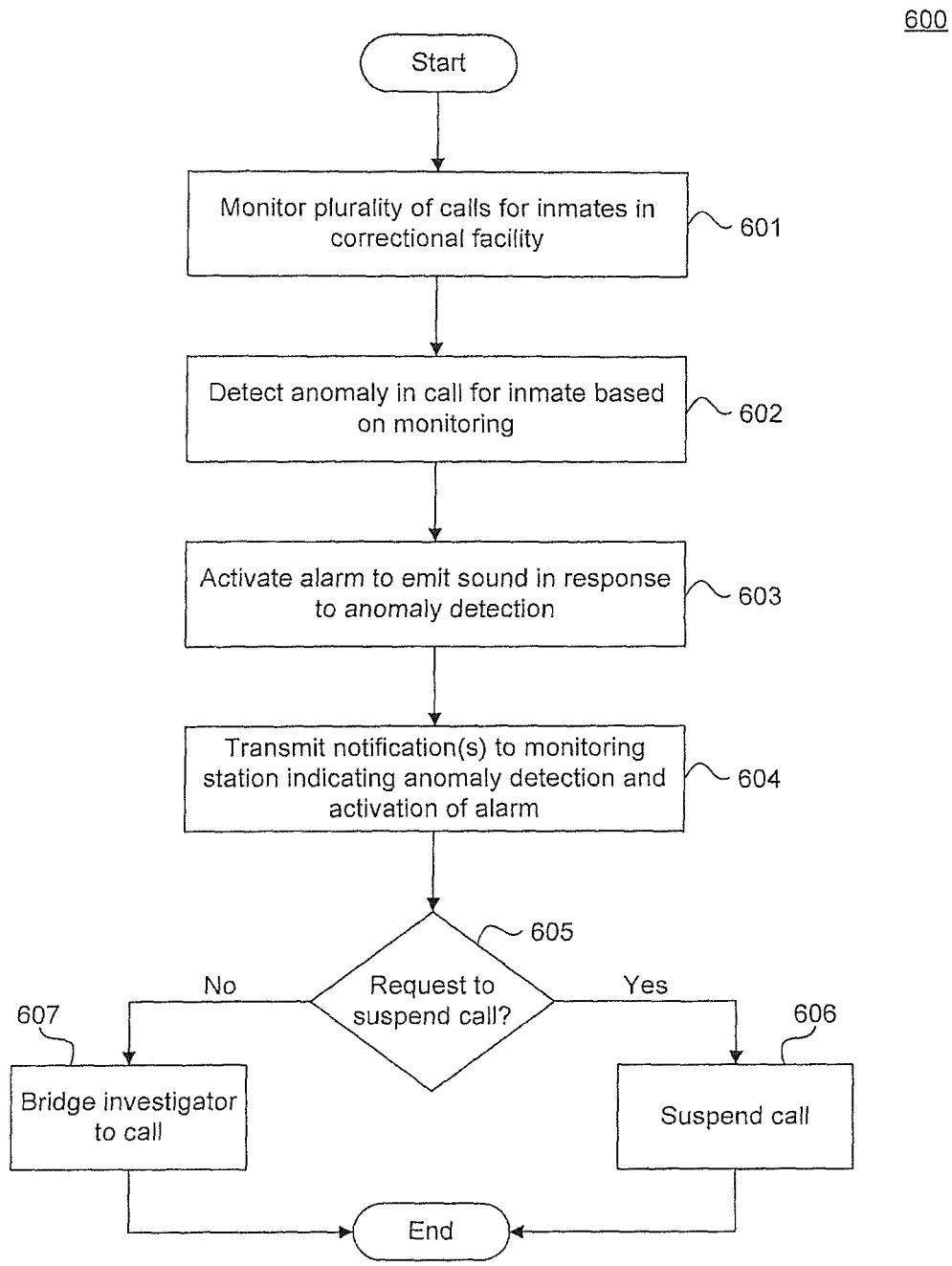
FIG. 6 illustrates a flowchart diagram of a method for monitoring inmate calls and activating an alarm, according to embodiments of the present disclosure.

FIG. 6 illustrates a flowchart diagram of a method 600 of monitoring inmate calls and activating an alarm, via a monitoring server, such as inmate call monitoring server 300 of FIG. 3, according to embodiments of the present disclosure. The steps of method 600 are performed by subsystems and modules of inmate call monitoring server 300, such as monitoring subsystem 310, inmate profile module 312, audio analysis module 314, anomaly detection module 316, and/or alarm control module 318. Method 600 of FIG. 6 begins with step 601 of monitoring a plurality of calls for inmates in a correctional facility. For example, inmate call monitoring server 300 receives communication data for a plurality of inmate communications from communication center 110 and monitors the communication data for the plurality of inmate calls through monitoring subsystem 310. In some embodiments, each inmate communication includes a participating inmate from among a plurality of inmates in the correctional facility.

At step 602, the inmate call monitoring server detects an anomaly in a call for an inmate based on monitoring the plurality of inmate calls. For example, the anomaly detection module 316 in the inmate call monitoring server 300 detects an anomaly in a first inmate communication in the plurality of inmate communications, such as by detecting at least one of a three-way calling event, a call forwarding event, extra dialed digits in the call, or a dialed phone number not listed in a list of phone numbers approved for the first inmate. At step 603, the inmate call monitoring server activates an alarm to emit a sound in response to the anomaly detection. For example, in response to detecting the anomaly, the alarm control module 318 the inmate call monitoring server 300 activates an alarm to emit a sound in an area of the correctional facility by transmitting an activation signal to the alarm system 400. In some cases, the alarm system 400 emits the sound in the area of the correctional facility until the alarm system 400 is manually turned off by an employee of the correctional facility.

At step 604, the inmate call monitoring server transmits one or more notifications to the monitoring station indicating anomaly detection and activation of an alarm. For example, the inmate call monitoring server 300 transmits, to at least one of the inmate call monitoring stations 204a and 204b, one or more notifications indicating that a particular anomaly has been detected in the first inmate communication and that an alarm has been activated. In some embodiments, the one or more notifications cause the inmate call monitoring stations 204a and 204b to play audio of the first inmate communication through one or more speakers at the inmate call monitoring stations 204a and 204b.

At step 605, the inmate call monitoring server determines a request to suspend the call of the first inmate has been received. For example, the inmate call monitoring server 300 determines if at least one of the inmate call monitoring stations 204a and 204b has sent a request to the inmate call monitoring server 300 to suspend the first inmate communication. If a request to suspend the first inmate communication has been received by the inmate call monitoring server 300, then method 600 in this example proceeds to step 606. At step 606, the inmate call monitoring server 300 suspends the first inmate communication as requested by at least one of the inmate call monitoring stations 204a and 204b.

If a request to suspend the first inmate communication has not been received by the inmate call monitoring server 300, then method 600 in this example proceeds to step 607. In some embodiments, method 600 also proceeds to step 607 if the inmate call monitoring server 300 receives a specific request not to suspend the first inmate communication or a specific request to bridge an investigator to the first inmate communication. At step 607, the inmate call monitoring server bridges an investigator to the first inmate communication. For example, the inmate call monitoring server 300 bridges the user device of the investigator, such as investigator user device 206, to the phone call of the first inmate. The investigator is able to listen in on the conversation between the first inmate and an outsider and investigate any suspicious or fraudulent activities occurring in the phone call.

Figure 7:
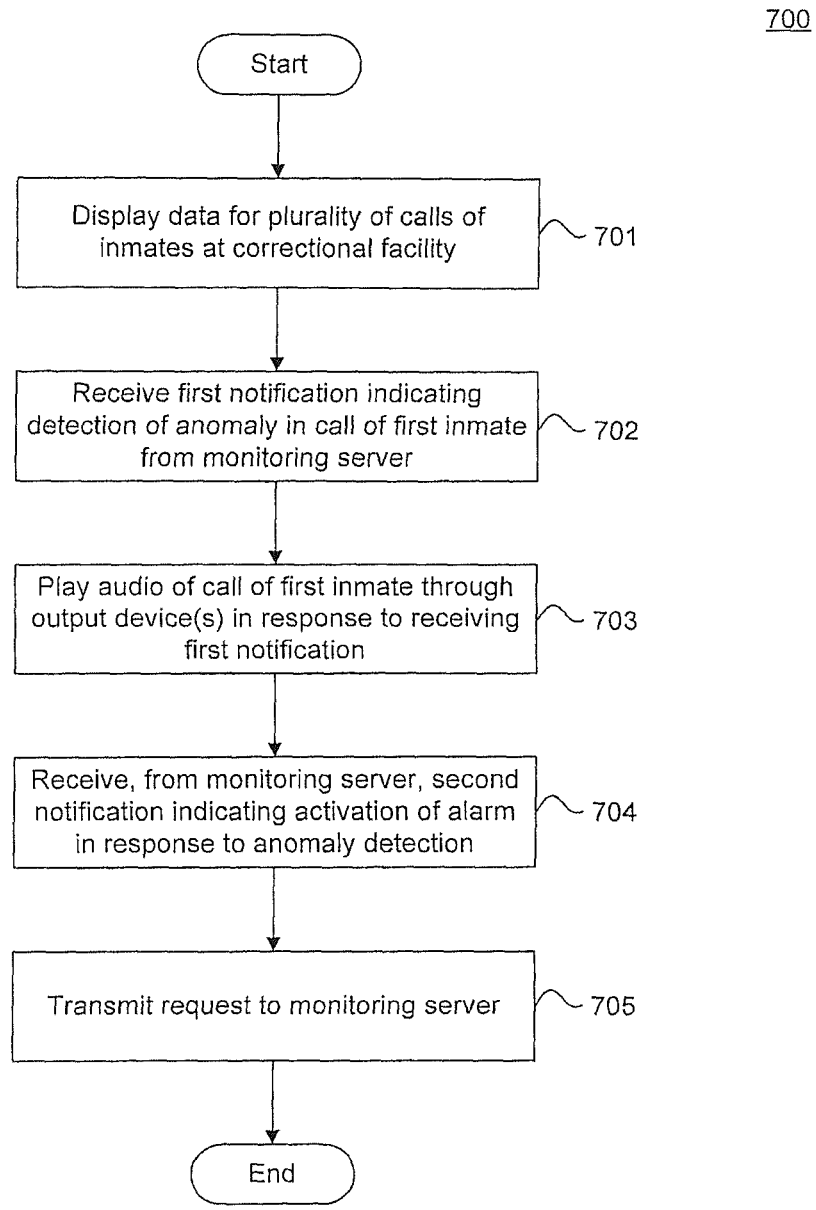
FIG. 7 illustrates a flowchart diagram of a method for monitoring inmate calls and responding to detected anomalies in inmate calls, according to embodiments of the present disclosure.

FIG. 7 illustrates a flowchart diagram of a method 700 of monitoring inmate calls and responding to detected anomalies in inmate calls via inmate call monitoring center 120 of FIG. 1, according to embodiments of the present disclosure. The steps of method 700 are performed by components of inmate call monitoring center 120, such as inmate call monitoring stations 204a and 204b. Method 700 of FIG. 7 begins with step 701 of displaying data for a plurality of calls of inmate at a correctional facility. For example, at least one of inmate call monitoring stations 204a and 204b displays data regarding a plurality of inmate communications occurring in a correctional facility on a display, in which each inmate communication includes a participating inmate from among a plurality of inmates in the correctional facility.

At step 702, the inmate call monitoring station receives a first notification indicating detection of an anomaly in a call of a first inmate from a monitoring server. For example, at least one of inmate call monitoring stations 204a and 204b receives a first notification from inmate call monitoring server 300 indicating detection of an anomaly in the first inmate communication, such as a three-way calling event, a call forwarding event, extra dialed digits in the first inmate communication, or a dialed phone number not listed in a list of phone numbers approved for the first inmate communication. At step 703, the inmate call monitoring station plays audio of the call of the first inmate through one or more output devices in response to receiving the first notification. For example, at least one of inmate call monitoring stations 204a and 204b plays audio of the first inmate communication through one or more output devices, such as speakers at one of the inmate call monitoring stations 204a and 204b.

At step 704, the inmate call monitoring station receives a second notification indicating activation of an alarm in response to anomaly detection. For example, at least one of inmate call monitoring stations 204a and 204b receives a second notification from inmate call monitoring server 300 in response to detection of the anomaly in the first inmate communication. In some embodiments, the second notification indicates that an alarm has been activated to emit a sound in an area of the correctional facility until the alarm is manually turned off. In some cases, the alarm is unable to be turned off manually by an employee of the correctional facility until after a predetermined period of time has elapsed. At step 705, the inmate call monitoring station transmits a request to the monitoring server. For example, at least one of inmate call monitoring stations 204a and 204b transmits a request or indication to the inmate call monitoring server 300. In some embodiments, the request or indication requests for the inmate call monitoring server 300 to suspend the first inmate communication, bridge an investigator to the first inmate communication, review call history of a participant of the first inmate communication, and/or generate a report on the participant, including information regarding at least one of the participant's previous violations, the participant's calling history, whitelisted numbers for the participant, blacklisted numbers of the participant, or the like.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 8:
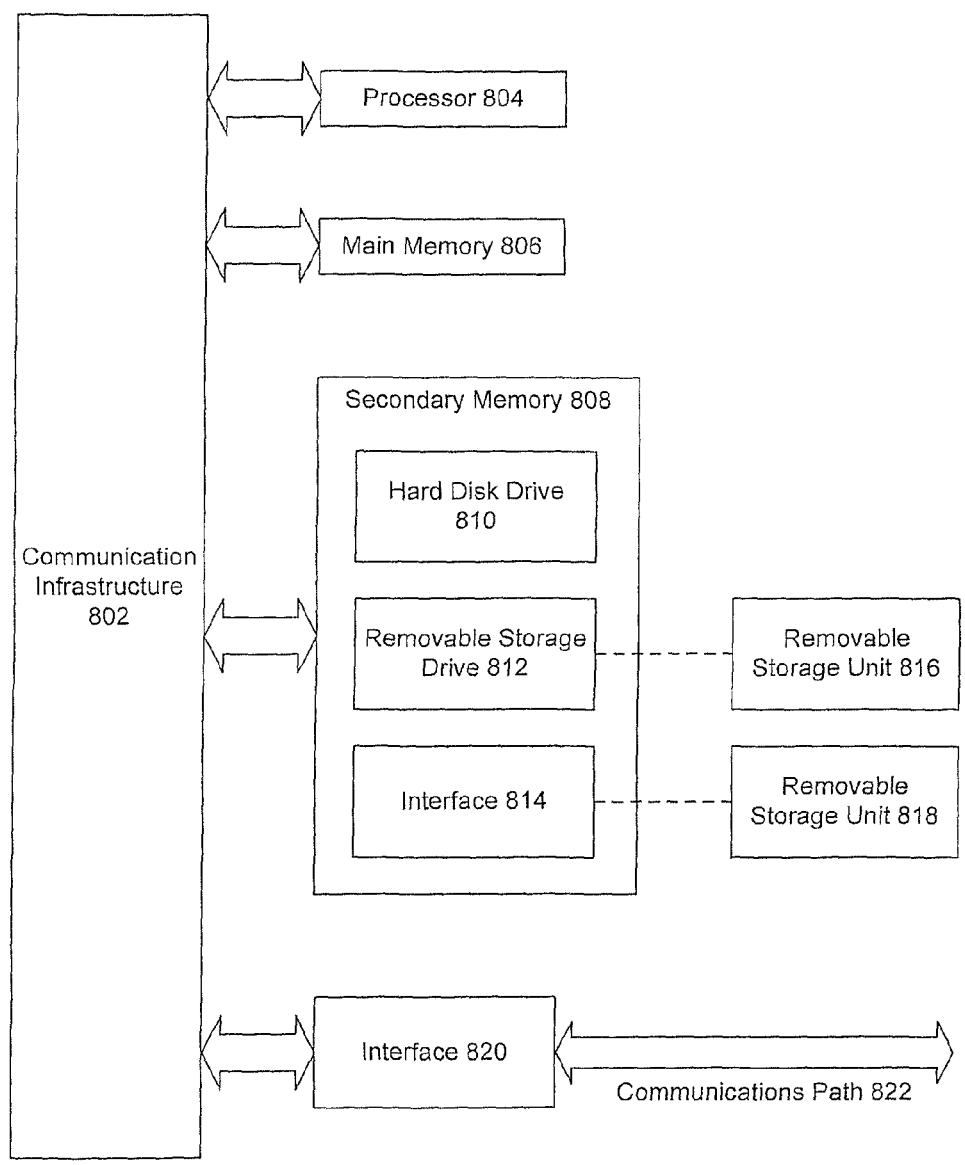
FIG. 8 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 6-7 can be implemented in the environment of one or more computer systems or other processing systems. An example of such a computer system 800 is shown in FIG. 8. One or more of the modules depicted in the previous figures can be at least partially implemented on one or more distinct computer systems 800.

Computer system 800 includes one or more processors, such as processor 804. Processor 804 can be a special purpose or a general purpose digital signal processor. Processor 804 is connected to a communication infrastructure 802 (for example, a bus or network). Various software implementations are described in terms of this exemplary computer system. After reading this description, it will become apparent to a person skilled in the relevant art(s) how to implement the disclosure using other computer systems and/or computer architectures.

Computer system 800 also includes a main memory 806, preferably random access memory (RAM), and may also include a secondary memory 808. Secondary memory 808 may include, for example, a hard disk drive 810 and/or a removable storage drive 812, representing a floppy disk drive, a magnetic tape drive, an optical disk drive, or the like. Removable storage drive 812 reads from and/or writes to a removable storage unit 816 in a well-known manner. Removable storage unit 816 represents a floppy disk, magnetic tape, optical disk, or the like, which is read by and written to by removable storage drive 812. As will be appreciated by persons skilled in the relevant art(s), removable storage unit 816 includes a computer usable storage medium having stored therein computer software and/or data.

In alternative implementations, secondary memory 808 may include other similar means for allowing computer programs or other instructions to be loaded into computer system 800. Such means may include, for example, a removable storage unit 818 and an interface 814. Examples of such means may include a program cartridge and cartridge interface (such as that found in video game devices), a removable memory chip (such as an EPROM, or PROM) and associated socket, a thumb drive and USB port, and other removable storage units 818 and interfaces 814 which allow software and data to be transferred from removable storage unit 818 to computer system 800.

Computer system 800 may also include a communications interface 820. Communications interface 820 allows software and data to be transferred between computer system 800 and external devices. Examples of communications interface 820 may include a modem, a network interface (such as an Ethernet card), a communications port, a PCM-CIA slot and card, etc. Software and data transferred via communications interface 820 are in the form of signals which may be electronic, electromagnetic, optical, or other signals capable of being received by communications interface 820. These signals are provided to communications interface 820 via a communications path 822. Communications path 822 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 816 and 818 or a hard disk installed in hard disk drive 810. These computer program products are means for providing software to computer system 800.

Computer programs (also called computer control logic) are stored in main memory 806 and/or secondary memory 808. Computer programs may also be received via communications interface 820. Such computer programs, when executed, enable the computer system 800 to implement the present disclosure as discussed herein. In particular, the computer programs, when executed, enable processor 804 to implement the processes of the present disclosure, such as any of the methods described herein. Accordingly, such computer programs represent controllers of the computer system 800. Where the disclosure is implemented using software, the software may be stored in a computer program product and loaded into computer system 800 using removable storage drive 812, interface 814, or communications interface 820.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. An inmate call monitoring station comprising:
   a display;
   an input device;
   an output device;
   a network interface device configured to communicate with a monitoring server and an alarm; and
   a processor and/or circuit configured to:
      display data regarding a plurality of inmate communications occurring in a correctional facility on the display, wherein each inmate communication includes a participating inmate from among a plurality of inmates in the correctional facility;
      receive, from the monitoring server, a first notification indicating detection of a predefined event in a first inmate communication;
      play audio of the first inmate communication through the output device in response to receiving the first notification;
      receive, from the monitoring server, a second notification indicating activation of the alarm in response to the detection of the predefined event, wherein the alarm is activated by the monitoring server to emit a sound in an area of the correctional facility until the alarm is manually turned off; and
      transmit, to the monitoring server, a request to suspend the first inmate communication, wherein the request is generated by the input device.

2. The inmate call monitoring station of claim 1, wherein the data regarding the plurality of inmate communications occurring in the correctional facility comprises a name of a participant of the first inmate communication, an identification number of the participant, a dialed phone number, a name and identity of a call recipient, a date, time, and a call duration for each inmate communication in the plurality of inmate communications.

3. The inmate call monitoring station of claim 1, wherein the predefined event in the first inmate communication comprises a three-way calling event, a call forwarding event, extra dialed digits in the first inmate communication, or a dialed phone number not in a list of phone numbers approved for the first inmate.

4. The inmate call monitoring station of claim 1, wherein the first notification indicating detection of the predefined event comprises data regarding an identity of the first inmate, a dialed phone number in the first inmate communication, time and duration of the first inmate communication, dates and times of prior communications of a participant of the first inmate communication, a list of violations from prior communications of the participant of the first inmate communication, and audio of the prior communications of the participant of the first inmate communication.

5. The inmate call monitoring station of claim 1, wherein the alarm is unable to be turned off manually by an administrator of the correctional facility until after a predetermined period of time has elapsed.

6. The inmate call monitoring station of claim 1, wherein the area of the correctional facility includes the alarm and the inmate call monitoring station.

7. The inmate call monitoring station of claim 1, wherein the first inmate communication is suspended by the monitoring server in response to transmission of the request to the monitoring server.

8. A method for inmate call monitoring at a monitoring station in a correctional facility, the method comprising:
   displaying data regarding a plurality of inmate communications occurring in the correctional facility on a display of the monitoring station, wherein each inmate communication includes a participating inmate from among a plurality of inmates in the correctional facility;
   receiving, from a monitoring server, a first notification indicating detection of a predefined event in a first inmate communication;
   playing audio of the first inmate communication through an output device of the monitoring station in response to receiving the first notification; and
   receiving, from the monitoring server, a second notification indicating activation of an alarm in response to the detection of the predefined event, wherein the alarm is activated by the monitoring server to emit a sound in an area of the correctional facility until the alarm is manually turned off.

9. The method of claim 8, further comprising:
   transmitting, to the monitoring server, a request to suspend the first inmate communication, wherein the request is generated by an input device of the monitoring station.

10. The method of claim 8, further comprising:
   transmitting, to the monitoring server, a request to bridge a user device of an investigator to the first inmate communication, wherein the request is generated by an input device of the monitoring station.

11. The method of claim 8, wherein the data regarding the plurality of inmate communications occurring in the correctional facility comprises a name of a participant of the first inmate communication, an identification number of the participant, a dialed phone number, a name and identity of a call recipient, a date, time, and a call duration for each inmate communication in the plurality of inmate communications.

12. The method of claim 8, wherein the predefined event in the first inmate communication comprises a three-way calling event, a call forwarding event, extra dialed digits in the first inmate communication, or a dialed phone number not in a list of phone numbers approved for the first inmate.

13. The method of claim 8, wherein the first notification indicating detection of the predefined event comprises data regarding an identity of the first inmate, a dialed phone number in the first inmate communication, time and duration of the first inmate communication, dates and times of prior communications of a participant of the first inmate communication, a list of violations from prior communications of the participant of the first inmate communication, and audio of the prior communications of the participant of the first inmate communication.

14. The method of claim 8, wherein the alarm is unable to be turned off manually by an administrator of the correctional facility until after a predetermined period of time has elapsed.

15. A computing device for monitoring inmate calls in a correctional facility, the computing device comprising:
   an input device;
   an output device;
   a network interface device configured to communicate with a monitoring server and an alarm system; and
   a processor and/or circuit configured to:
      monitor data regarding a plurality of inmate communications occurring in the correctional facility, wherein each inmate communication includes a participating inmate from among a plurality of inmates in the correctional facility;
      receive, from the monitoring server, a first notification indicating detection of a predefined event in a first inmate communication;
      play audio of the first inmate communication through the output device in response to receiving the first notification;
      receive, from the monitoring server, a second notification indicating activation of the alarm system in response to the detection of the predefined event, wherein the alarm system is activated by the monitoring server to emit a sound in an area of the correctional facility until the alarm system is manually turned off; and
      transmit, to the monitoring server, a request to bridge an investigator to the first inmate communication, wherein the request is generated by the input device.

16. The computing device of claim 15, wherein the data regarding the plurality of inmate communications occurring in the correctional facility comprises a name of a participant of the first inmate communication, an identification number of the participant, a dialed phone number, a name and identity of a call recipient, a date, time, and a call duration for each inmate communication in the plurality of inmate communications.

17. The computing device of claim 15, wherein the predefined event in the first inmate communication comprises a three-way calling event, a call forwarding event, extra dialed digits in the first inmate communication, or a dialed phone number not in a list of phone numbers approved for the first inmate.

18. The computing device of claim 15, wherein the first notification indicating detection of the predefined event comprises data regarding an identity of the first inmate, a dialed phone number in the first inmate communication, time and duration of the first inmate communication, dates and times of prior communications of a participant of the first inmate communication, a list of violations from prior communications of the participant of the first inmate communication, and audio of the prior communications of the participant of the first inmate communication.

19. The computing device of claim 15, wherein a user device of the investigator is bridged to the first inmate communication in response to transmission of the request to the monitoring server.

20. The computing device of claim 15, wherein the alarm system comprises a sound module configured to emit the sound that is unable to be turned off manually by an administrator of the correctional facility until after a predetermined period of time has elapsed.

* * * * *